(12) United States Patent
Kondo

(10) Patent No.: US 11,700,339 B2
(45) Date of Patent: Jul. 11, 2023

(54) IMAGE FORMING APPARATUS, CONTROL METHOD THEREOF, AND STORAGE MEDIUM FOR CHANGING A DISPLAY LANGUAGE

(71) Applicant: CANON KABUSHIKI KAISHA, Tokyo (JP)

(72) Inventor: Yuichi Kondo, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/857,971

(22) Filed: Jul. 5, 2022

(65) Prior Publication Data

US 2022/0337714 A1  Oct. 20, 2022

Related U.S. Application Data

(63) Continuation of application No. 16/517,228, filed on Jul. 19, 2019, now Pat. No. 11,418,663.

(30) Foreign Application Priority Data

Jul. 25, 2018  (JP) ................................. 2018-139582

(51) Int. Cl.
H04N 1/00 (2006.01)

(52) U.S. Cl.
CPC ..... H04N 1/00498 (2013.01); H04N 1/00411 (2013.01); H04N 1/00413 (2013.01); H04N 2201/0094 (2013.01)

(58) Field of Classification Search
CPC .................. H04N 1/00498; H04N 1/00413
See application file for complete search history.

(56) References Cited

U.S. PATENT DOCUMENTS

| | | | |
|---|---|---|---|
| 2005/0213996 A1* | 9/2005 | Amano | G03G 15/6508 399/16 |
| 2011/0044715 A1* | 2/2011 | Ogata | G03G 15/6552 399/81 |
| 2013/0201512 A1 | 8/2013 | Takatani | |

(Continued)

FOREIGN PATENT DOCUMENTS

| | | | |
|---|---|---|---|
| JP | 2001273068 A | 10/2001 | |
| JP | 2003209643 A | 7/2003 | |

(Continued)

*Primary Examiner* — Benjamin O Dulaney
(74) *Attorney, Agent, or Firm* — Canon U.S.A., Inc. IP Division

(57) ABSTRACT

An image forming apparatus a display unit includes a reception unit configured to receive a user operation, a setting unit configured to set, as a default language, a language selected by a plurality of operations, a changing unit configured to change, from the default language to a language different from the default language, a language to be displayed by a single operation, and a control unit configured to perform control in such a manner that in a case where the setting unit does not change the default language and the changing unit changes the language to be displayed to the language different from the default language, the language to be displayed is changed to the default language, whereas in a case where the setting unit changes the default language to another language, the language to be displayed is not changed from the other language.

26 Claims, 18 Drawing Sheets

(56) References Cited

U.S. PATENT DOCUMENTS

| | | | |
|---|---|---|---|
| 2015/0373215 A1* | 12/2015 | Hayashi | H04N 1/4426 358/1.14 |
| 2016/0156804 A1* | 6/2016 | Suzuki | H04N 1/00498 358/1.11 |
| 2016/0216919 A1* | 7/2016 | Zakharov | G06F 3/1232 |
| 2017/0353626 A1* | 12/2017 | Nakamura | H04N 1/00474 |
| 2018/0091668 A1* | 3/2018 | Tanaka | H04N 1/00506 |
| 2018/0213123 A1* | 7/2018 | Iijima | H04N 1/4433 |
| 2019/0050184 A1* | 2/2019 | Ozawa | G06F 3/1222 |
| 2020/0053239 A1* | 2/2020 | Abaquita | H04N 1/00408 |

FOREIGN PATENT DOCUMENTS

| | | |
|---|---|---|
| JP | 2005-197923 A | 7/2005 |
| JP | 2005-205598 A | 8/2005 |
| JP | 2015-89067 A | 5/2015 |

* cited by examiner

FIG.17

| USER ID | LANGUAGE |
|---|---|
| aaa | JAPANESE |
| bbb | ENGLISH |
| ccc | FRENCH |

1701

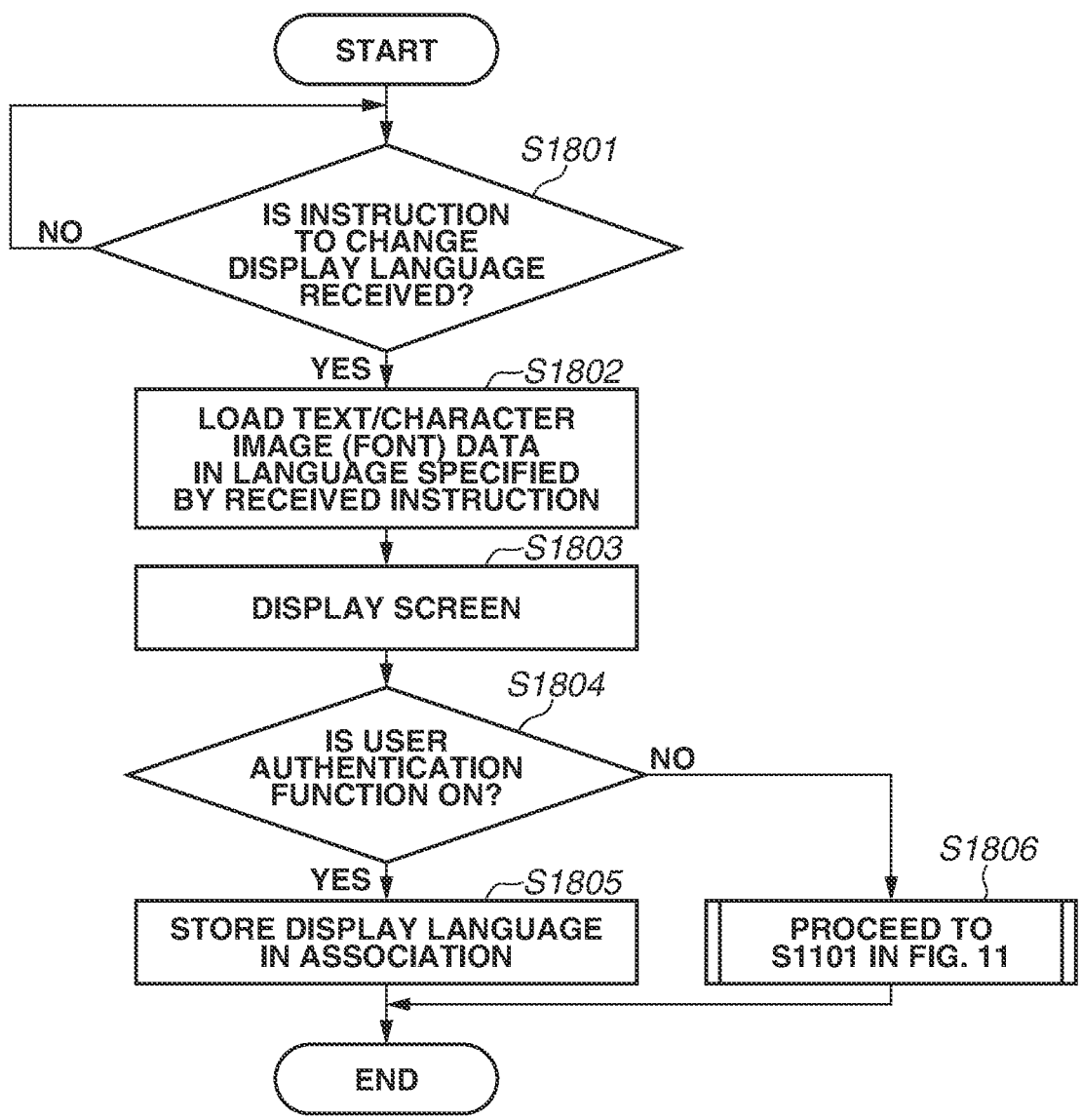

IMAGE FORMING APPARATUS, CONTROL METHOD THEREOF, AND STORAGE MEDIUM FOR CHANGING A DISPLAY LANGUAGE

CROSS-REFERENCE TO RELATED APPLICATIONS

This application is a Continuation of U.S. application Ser. No. 16/517,228, filed Jul. 19, 2019, which claims the benefit of priority from Japanese Patent Application No. 2018-139582, filed Jul. 25, 2018, each of which is hereby incorporated by reference herein in their entirety.

BACKGROUND

Field of the Disclosure

The present disclosure generally relates to information processing and, more particularly, to an image forming apparatus, a control method thereof, and a storage medium.

Description of the Related Art

Some information processing apparatuses such as multi-function peripherals designed for use by users of various nationalities are configured to enable the users to select a display language of a screen from a plurality of languages.

In an environment in which, for example, a plurality of users of different nationalities uses a single information processing apparatus, there is a likely case that each user selects a language that the user wishes to use from a plurality of languages and changes the display language of the screen to the selected language.

Japanese Patent Application Laid-Open No. 2015-89067 discusses a technique in which a user selects a language that the user wishes to use from a list of a plurality of languages on an operation unit of an information processing apparatus and a display language of a screen is changed to the user-selected language and the user-selected language is set as a default language of the information processing apparatus.

Further, Japanese Patent Application Laid-Open No. 2005-205598 discusses a technique in which a language selection button is displayed on an operation unit of an information processing apparatus, and when the language selection button is selected by a user, the information processing apparatus selects a single language from a plurality of pre-registered languages and changes a display language to the selected language.

In a case where a language that is understandable by a majority of users of an information processing apparatus is set as a default language of the information processing apparatus as in the information processing apparatus discussed in Japanese Patent Application Laid-Open No. 2015-89067, a user who cannot understand the default language needs to change the language each time the user uses the information processing apparatus. A likely case is that the user who cannot understand the default language changes the language using a button for changing the display language of a screen as in the information processing apparatus discussed in Japanese Patent Application Laid-Open No. 2005-205598. As used herein, the default language refers to a language that is settable by a user having logged in using an administrator user ID and an administrator password, and in a case of changing the language without changing the default setting, any user can change the language. In such a case, after the user who cannot understand the default language of the information processing apparatus changes the language without changing the default setting, if a user who can understand the default language of the information processing apparatus is to use the information processing apparatus, the user who is to use the information processing apparatus needs to change the language to the default language, which is inconvenient for the user.

SUMMARY

The present disclosure has been made in view of the above-described issue and is directed to a system whereby a user who wishes to use an information processing apparatus in a default language can use the information processing apparatus in the default language without changing the language to the default language in a case where the language is changed without changing the default language.

According to an aspect of the present disclosure, an image forming apparatus including a scan function of reading a document image and generating image data, a copy function of printing an image on a sheet based on the image data, and a display unit includes a reception unit configured to receive a user operation, a setting unit configured to set, as a default language of the image forming apparatus, a language selected as a result of the reception unit receiving a plurality of operations while the display unit displays a predetermined screen, a changing unit configured to change, from the default language to a language different from the default language, a language to be displayed on the display unit as a result that the reception unit receives a single operation while the display unit displays the predetermined screen, and a control unit configured to perform control in such a manner that in a case where the setting unit does not change the default language and the changing unit changes the language to be displayed on the display unit to the language different from the default language, and a predetermined period of time elapses while the reception unit does not receive an operation performed by the user, the language to be displayed on the display unit is changed to the default language set by the setting unit, whereas in a case where the setting unit changes the default language to another language, and the predetermined period of time elapses while the reception unit does not receive an operation performed by the user, the language to be displayed on the display unit is not changed from the other language, wherein the predetermined screen is a function selection screen on which the user selects a function to be used from a plurality of functions including the copy function and the scan function.

Further features of the present disclosure will become apparent from the following description of exemplary embodiments with reference to the attached drawings.

BRIEF DESCRIPTION OF THE DRAWINGS

FIG. 17 is a diagram illustrating an example of a list in which each user ID is stored in association with a display language set by the user of the user ID.

FIG. 18 is a flowchart illustrating a process at the time of receiving an instruction to change the display language.

DESCRIPTION OF THE EMBODIMENTS

Various exemplary embodiments, features, and aspects of the present disclosure will be described below with reference to the drawings. Each configuration specified in the exemplary embodiments is a mere example and is not intended to limit the scope of the disclosure.

Figure 1:
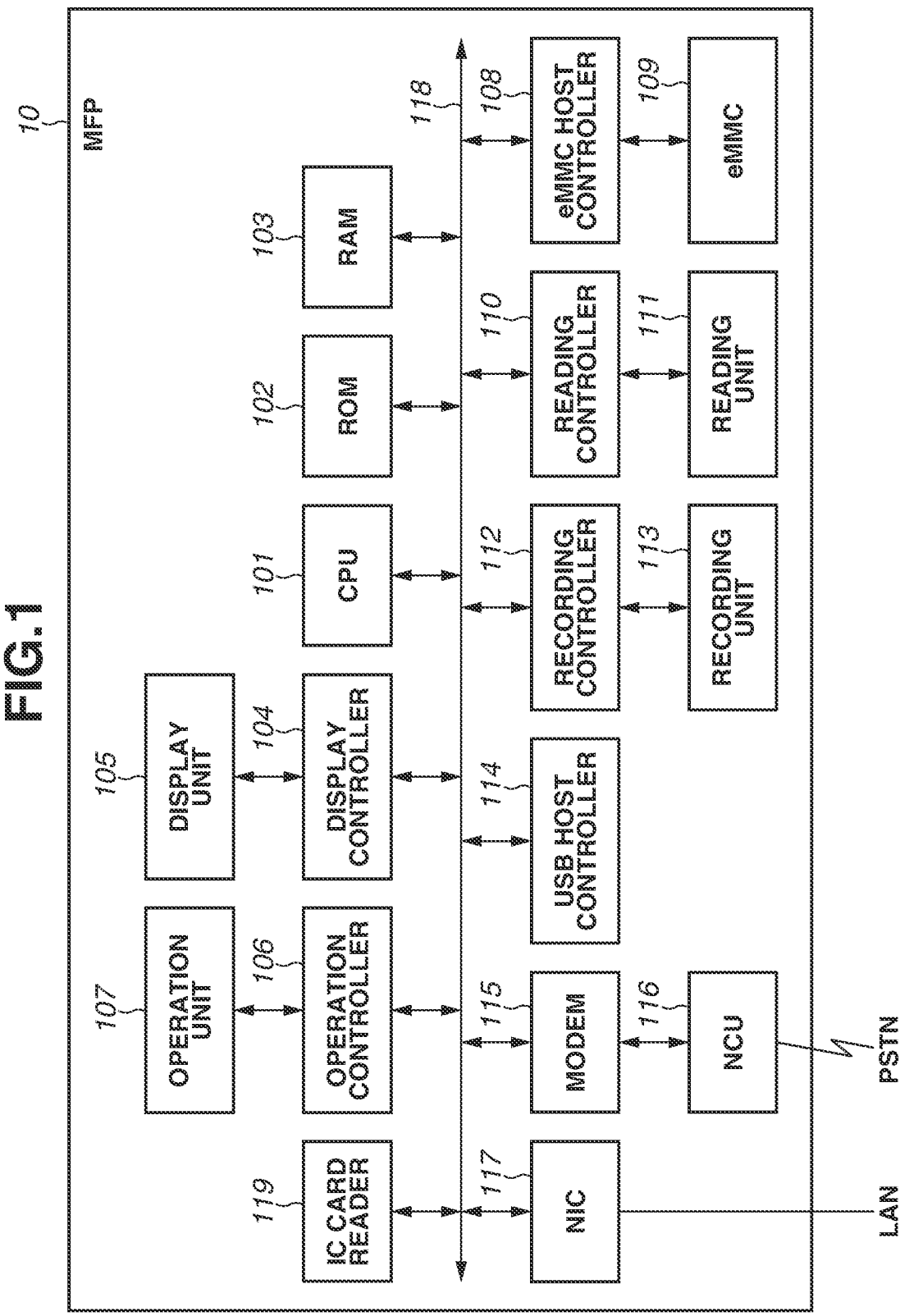
FIG. 1 is a block diagram illustrating an example of a hardware configuration of a multi-function peripheral (MFP).

A first exemplary embodiment will be described below. FIG. 1 is block diagram illustrating an example of a hardware configuration of a multi-function peripheral (MFP) 10.

As illustrated in FIG. 1, the MFP 10, which is an example of an information processing apparatus or image forming apparatus, includes a central processing unit (CPU) 101, a read-only memory (ROM) 102, a random access memory (RAM) 103, a display controller 104, a display unit 105, an operation controller 106, and an operation unit 107. Further, the MFP 10 further includes an embedded multimedia card (eMMC) host controller 108, an eMMC 109, a reading controller 110, a reading unit 111, a recording controller 112, and a recording unit 113. The MFP 10 further includes a universal serial bus (USB) host controller 114, a modem 115, a network control unit (NCU) 116, and a network interface card (NIC) 117.

Alternatively, the information processing apparatus according to the present exemplary embodiment can be an information processing apparatus such as a personal computer (PC) that includes a function of changing a display language.

The CPU 101, which may include one or more processors, one or more memories, circuitry, or a combination thereof, may control each device connected to a system bus 118. The CPU 101 may control a controller connected to a device so that the controller controls the device. If power is supplied, the CPU 101 executes a boot program stored in the ROM 102. Normally, the CPU 101 executes the boot program to thereby load a main program stored in a storage onto the RAM 103 and jumps to the beginning of the loaded main program. The RAM 103 functions not only as a loading area of the main program but also a work area of the main program.

The ROM 102 is a memory for storing programs and various types of data for use by the CPU 101.

The display controller 104 controls displaying of information by the display unit 105. The display unit 105 is a full-bitmap liquid crystal display (LCD) of wide video graphics array (WVGA) size. Meanwhile, the operation controller 106 controls input from the operation unit 107. The operation unit 107 is, for example, a touch panel overlaid on the display unit 105 and is a reception unit configured to receive a user operation. Alternatively, the operation unit 107 can be a physical key provided to the MFP 10.

The reading unit 111 optically reads a document and generates image data based on the read image data. An auto document feeder (not illustrated) is attached to the reading unit 111 as an optional device, and thus the reading unit 111 is capable of conveying a plurality of document sheets one by one and automatically reading each conveyed document sheet. The reading unit 111 is connected to the reading controller 110, and the CPU 101 controls the reading controller 110 so that the reading controller 110 controls the reading unit 111.

Further, the recording unit 113 prints an image on a sheet based on image data using an electrophotographic method. The recording unit 113 is connected to the recording controller 112, and the CPU 101 controls the recording controller 112 so that the recording controller 112 controls the recording unit 113.

The USB host controller 114 performs USB protocol control and mediates access to a USB device such as a USB memory connected to the MFP 10.

The modem 115 modulates/demodulates a signal necessary for fax communication. Further, the modem 115 is connected to the NCU 116. The signal modulated by the modem 115 is transmitted to a public switched telephone network (PSTN) via the NCU 116. The NCU 116 performs dial signal transmission/reception processing.

The NIC 117 controls communication via a local area network (LAN). The NIC 117 can be a NIC for connecting to a wired LAN or a NIC for connecting to a wireless LAN. Further, the MFP 10 can include two or more NICs.

The MFP 10 according to the present exemplary embodiment includes the eMMC 109 as a storage. The CPU 101 accesses the eMMC 109 via the eMMC host controller 108. Alternatively, the storage of the MFP 10 can be a hard disk drive (HDD) or solid state drive (SSD).

An integrated circuit (IC) card reader 119 is a unit configured to perform user authentication using an IC card.

Figure 2:
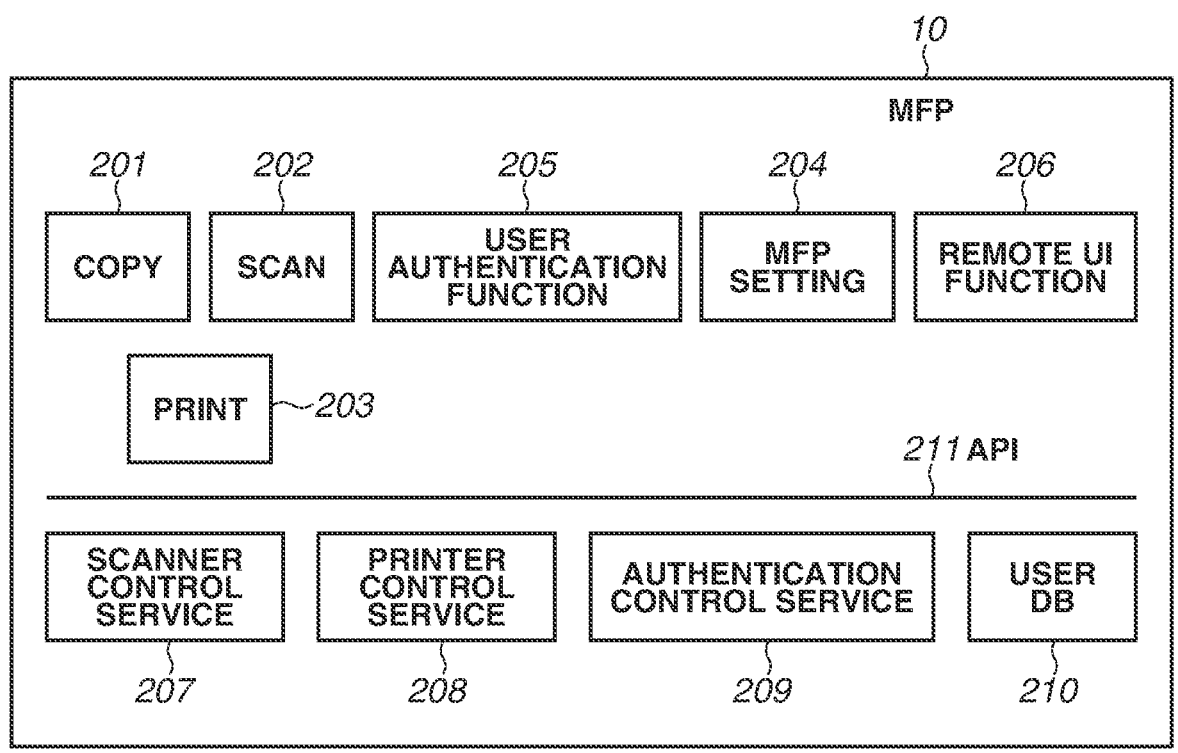
FIG. 2 is a block diagram illustrating an example of a software configuration of the MFP.

FIG. 2 is a block diagram illustrating an example of a software configuration of the MFP 10.

In FIG. 2, the MFP 10 includes a copy application 201, a scan application 202, and a print application 203 as applications running on a platform.

Further, the MFP 10 includes an application configured to realize an MFP setting 204 and an application configured to realize a user authentication function 205.

The MFP 10 includes a web server function configured to realize a remote UI function 206 so that error information about the MFP 10, the amount of remaining sheets in the MFP 10, and an address book of the MFP 10 can be displayed not on the display unit 105 but on a display unit of a client PC. Further, using the remote UI function 206, the MFP 10 can receive a change to the settings of the MFP 10 and input of a setting value at the client PC and acquire the setting value input from the client PC. Further, an application program interface (API) 211 communicates with various control services to activate the above-described applications.

The various control services are modules including a scanner control service 207, a printer control service 208, and an authentication control service 209. Further, a user database (DB) 210 configured to hold user authentication information is provided. The user DB 210 is a set of data stored in the eMMC 109.

The copy application 201, the scan application 202, the print application 203, and the MFP setting 204 provide user interfaces that are operable by the user.

The user authentication function 205 provides an authentication function for the user to log in to the MFP 10. Further, logged-in user management such as new user registration and change to user information is performed using the user DB 210.

Figure 3:
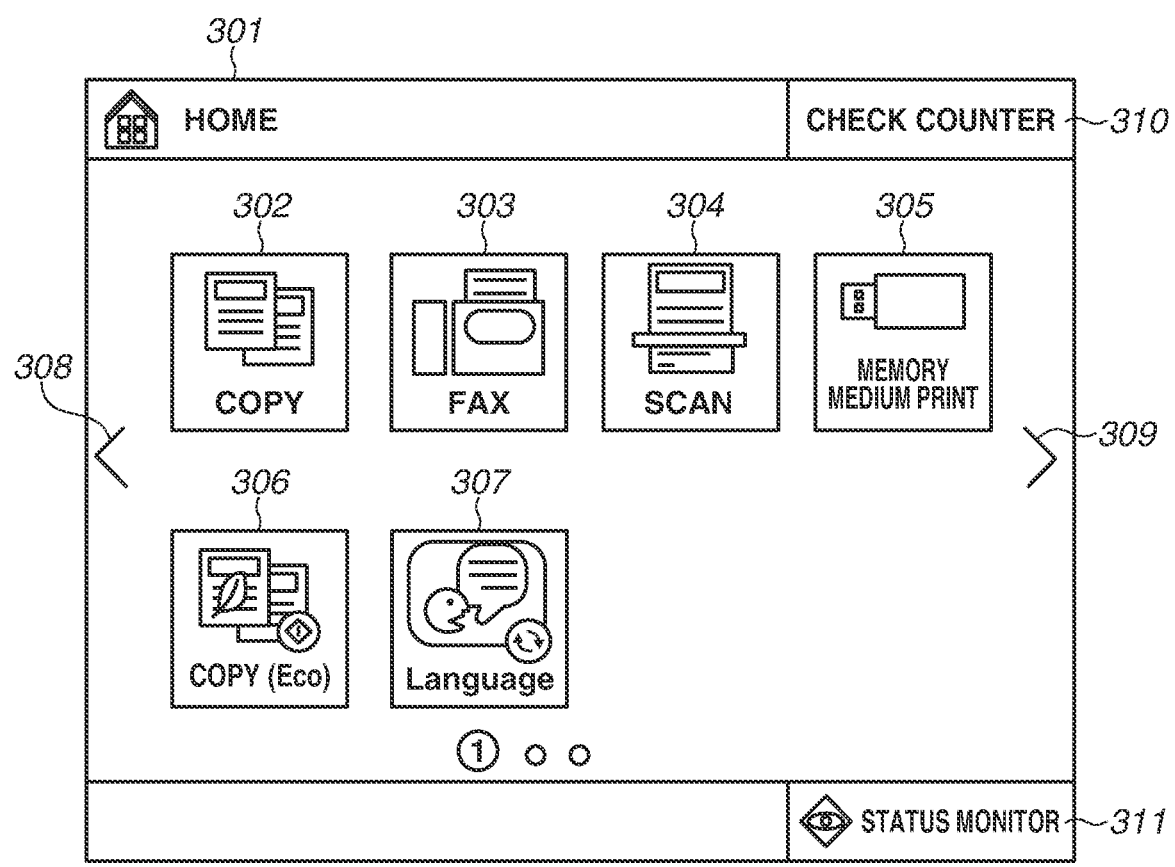
FIG. 3 is a diagram illustrating an example of a screen displayed on a display unit of the MFP.

FIG. 3 illustrates an example of a screen displayed on the display unit 105 of the MFP 10.

A screen 301 is a function selection screen on which buttons 302 to 307 for using a function are displayed. If the user selects any of the buttons 302 to 307, the CPU 101 activates the application for executing the function corresponding to the selected button, displays a screen for the user to use the function corresponding to the selected button, and executes the process that is registered in advance in the selected button.

If the copy button 302 is selected by the user, the CPU 101 displays a screen for using a copy function. If the fax button 303 is selected by the user, the CPU 101 displays a screen for using the fax function. If the scan button 304 is selected by the user, the CPU 101 displays a screen for using the scan function. If the memory medium print button 305 is selected by the user, the CPU 101 displays a screen for using the memory medium print function in which image data generated by a scan is stored in an external storage apparatus such as a USB memory. If the copy (eco) button 306 is selected by the user, the CPU 101 displays a screen for using the economy copy function. If the language selection button 307 is selected by the user, the CPU 101 changes the language of characters displayed on the screen 301. Details of an operation in the case where the language selection button 307 is selected will be described below with reference to FIGS. 8 to 10.

While the buttons 302 to 307 are displayed as an example on the screen 301, if a button 308 or 309 in FIG. 3 is selected, a button list different from the buttons 302 to 307 is displayed on the screen 301.

Further, if a check-counter button 310 is selected, the counter of the number of sheets printed by the MFP 10 is displayed by the CPU 101. Further, if a status monitor button 311 is selected, the CPU 101 displays a screen for monitoring the device status.

Figure 4:
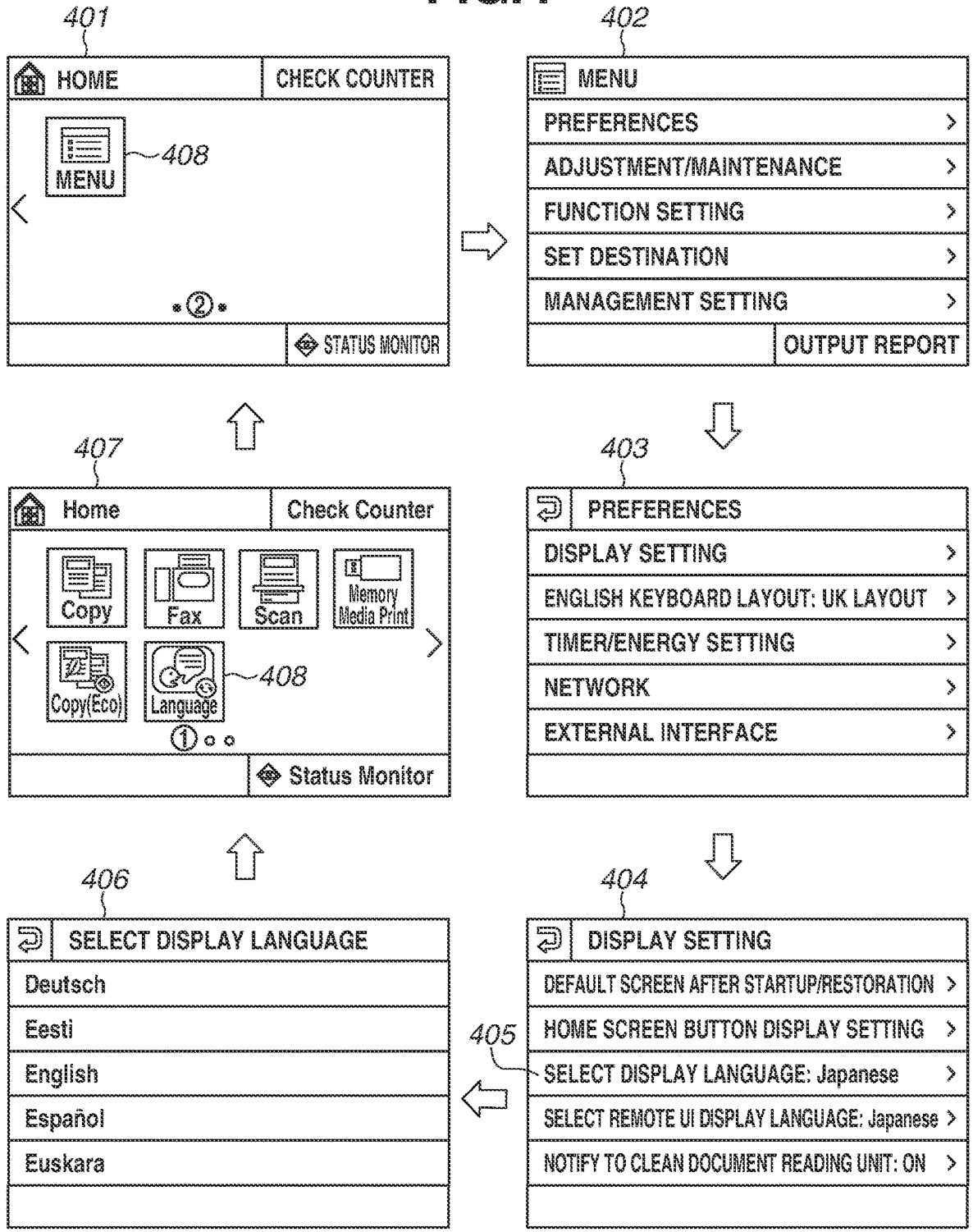
FIG. 4 is a diagram illustrating a sequence of setting a language of a screen displayed on the display unit of the MFP.

FIG. 4 illustrates a sequence of setting a language on a screen displayed on the display unit 105 of the MFP 10.

If a menu button 408 for displaying a setting screen for setting a setting of the MFP 10 is selected on a screen 401 which is a home screen, a menu list screen 402 is displayed. On the menu list screen 402, setting items classified by setting details, such as a preference setting of the MFP 10, adjustment setting, function setting such as copy and transmission functions, destination setting, and management setting, are displayed.

If the preference setting is selected on the screen 402, a setting list on a screen 403 is displayed. On the preference setting screen, settings that relate to a use environment of the MFP 10 are displayed, such as a display setting of the display unit 105, keyboard arrangement setting, timer setting, network setting, and external interface setting.

If the display setting is selected on the screen 403, a display setting list on a screen 404 is displayed.

If a display language selection button 405 is selected on the screen 404, a display language selection screen such as a screen 406 is displayed. If one of the plurality of displayed languages is selected, a screen with the display language changed to the selected language is displayed. For example, if English is selected on the screen 406, a screen such as a screen 407 displayed in English is displayed. As used herein, the display language refers to a language that is used on the screen displayed on the display unit 105. The display language selection button 405 on the screen 404 is selectable only by an administrator logged in to the MFP 10 using an administrator user ID and an administrator password. In a case where a user who is not the administrator user displays the screen 404, the display language selection button 405 is grayed out so that the button 405 is not selectable. Alternatively, the display language selection button 405 can be set selectable by any user.

A change of the display and language on each screen is executed by the CPU 101 in response to a user operation on the operation unit 107. Further, the language selected on the screen 406 is stored as language setting information in the eMMC 109.

Besides the above-described method of changing the language based on the user operation performed via the screen 406 displayed on the display unit 105, there is another method of changing the display language of the MFP 10 as described below.

Figure 6:
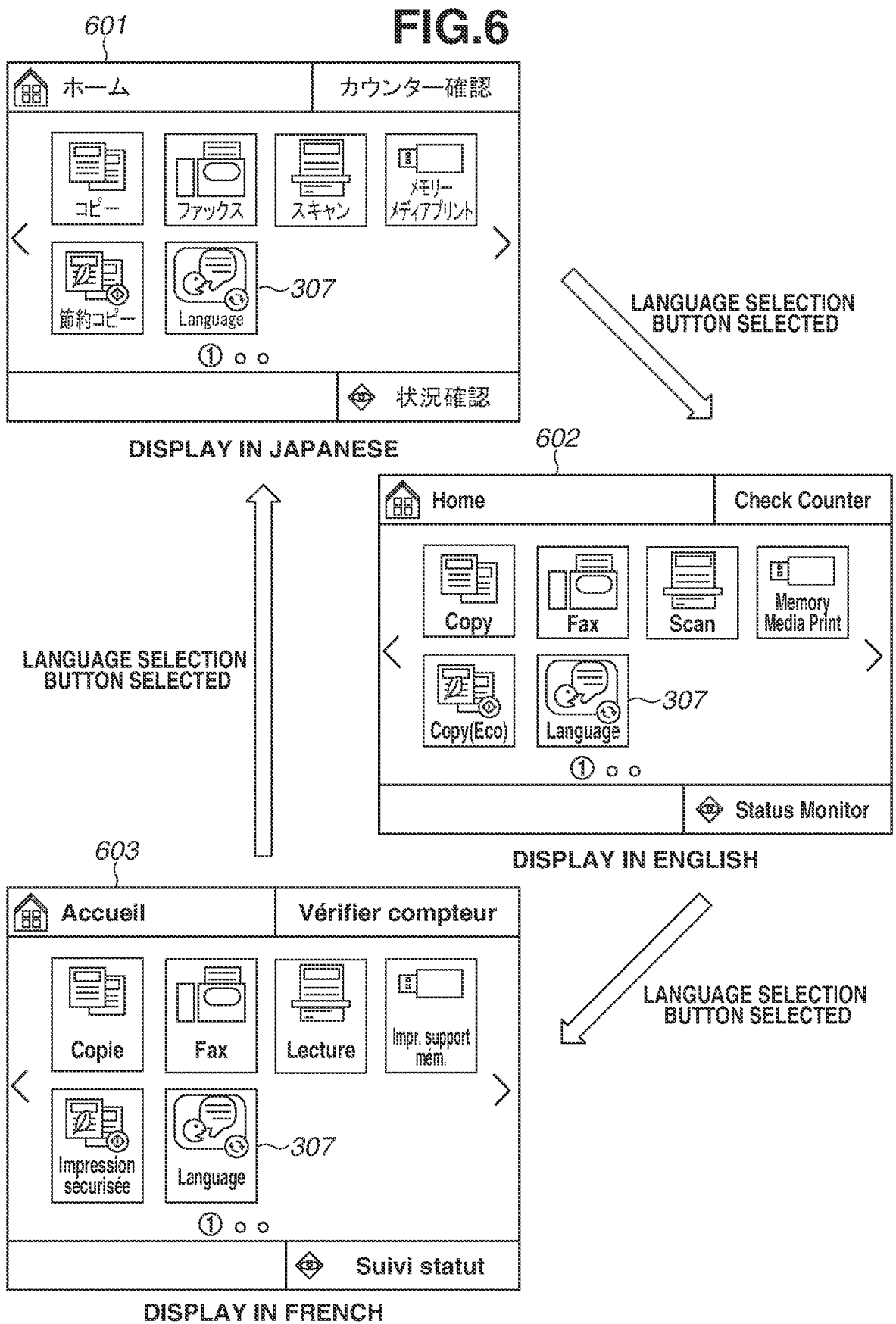
FIG. 6 is a diagram illustrating a sequence of changing a language when the language selection button on the screen displayed on the display unit of the MFP is selected.

FIG. 6 illustrates a sequence of changing the language when the language selection button 307 on the screen displayed on the display unit 105 of the MFP 10 is selected.

Figure 5:
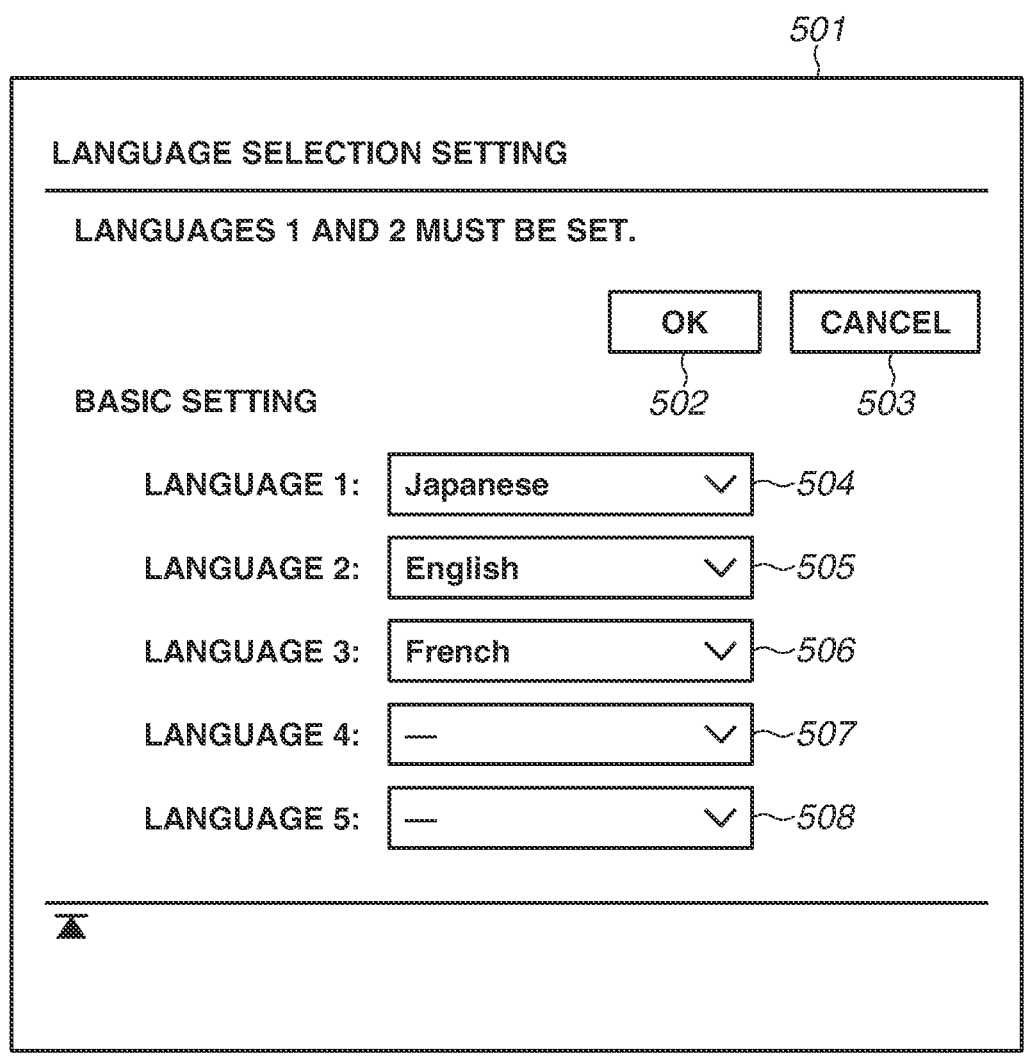
FIG. 5 is a diagram illustrating an example of a screen for setting a language to be changed when a language selection button is selected.

A screen 601 in FIG. 6 is displayed in Japanese, which is set as language 1 on a setting screen 501 in FIG. 5.

FIG. 5 illustrates an example of a screen for setting a language to which the display language is to be changed when the language selection button 307 is selected. The setting screen 501 is a screen for setting a display language candidate to which the display language is to be changed when the language selection button 307 is selected by the user. The setting screen 501 is not limited to that displayed on the display unit 105 and can be, for example, a screen displayed on the display unit of the client PC via a web browser of the client PC that is LAN-connected to the MFP 10.

If an OK button 502 is selected, the CPU 101 stores, in the eMMC 109, language information about languages that are input at the time point at which the OK button 502 is selected, as selection candidate languages of the language selection button 307. As used herein, the language information refers to information indicating the languages. The OK button 502 becomes selectable if two or more languages are input to entry fields 504 to 508.

If a cancel button 503 is selected, the CPU 101 closes the setting screen 501 without storing the language information about the languages that are input at the time point at which the cancel button 503 is selected, as the selection candidate languages of the language selection button 307 in the eMMC 109. The entry fields 504 to 508 are entry fields to which the user inputs language candidates to which the display language is to be changed when the language selection button 307 is selected. If any of the entry fields 504 to 508 is selected, a plurality of languages becomes selectable in a pull-down form. On the setting screen 501 in FIG. 5, Japanese, English, and French are set as languages 1, 2, and 3, respectively, as an example. A plurality of languages is set as candidate languages to which the display language is to be changed when one button (language selection button 307) is selected as in the case of the setting screen so that the display language can be changed to one of the plurality of languages without increasing the number of buttons. Alternatively, the setting on the setting screen 501 can be configured in such a manner that only one language is settable and the set language and the default language can alternately be set as the display language when the language selection button 307 is selected by the user. Further, a language selection button for each language set to be changed alternately with the default language can be displayed on a home screen such as the screen 401.

On the screen 601, when the language selection button 307 is selected, the display language of the MFP 10 is changed to English set as language 2 as in a screen 602. In the state where the screen on the display unit 105 is displayed in English set as language 2, when the language selection button 307 is selected, the language of the screen displayed on the display unit 105 of the MFP 10 is changed to French set as language 3 as in a screen 603. Further, in the state where the screen on the display unit 105 is displayed in French set as language 3 as in the screen 603, when the language selection the button 307 is selected, the language of the screen displayed on the display unit 105 of the MFP 10 is changed to Japanese set as language 1 as in the screen 601. In this way, each time the language selection button 307 is selected, the language of the screen displayed on the display unit 105 of the MFP 10 is changed according to the order of the languages set on the setting screen 501 in FIG. 5. The screens 601 to 603 to be displayed are not limited to those displayed on the display unit 105 and can be, for example, a screen displayed on the display unit of the client PC via the web browser of the client PC which is LAN-connected to the MFP 10.

Further, the button name displayed on the language selection button 307 according to the present exemplary embodiment can always be displayed in English as in the screens 601 to 603 or in the language corresponding to the display language.

Figure 7:
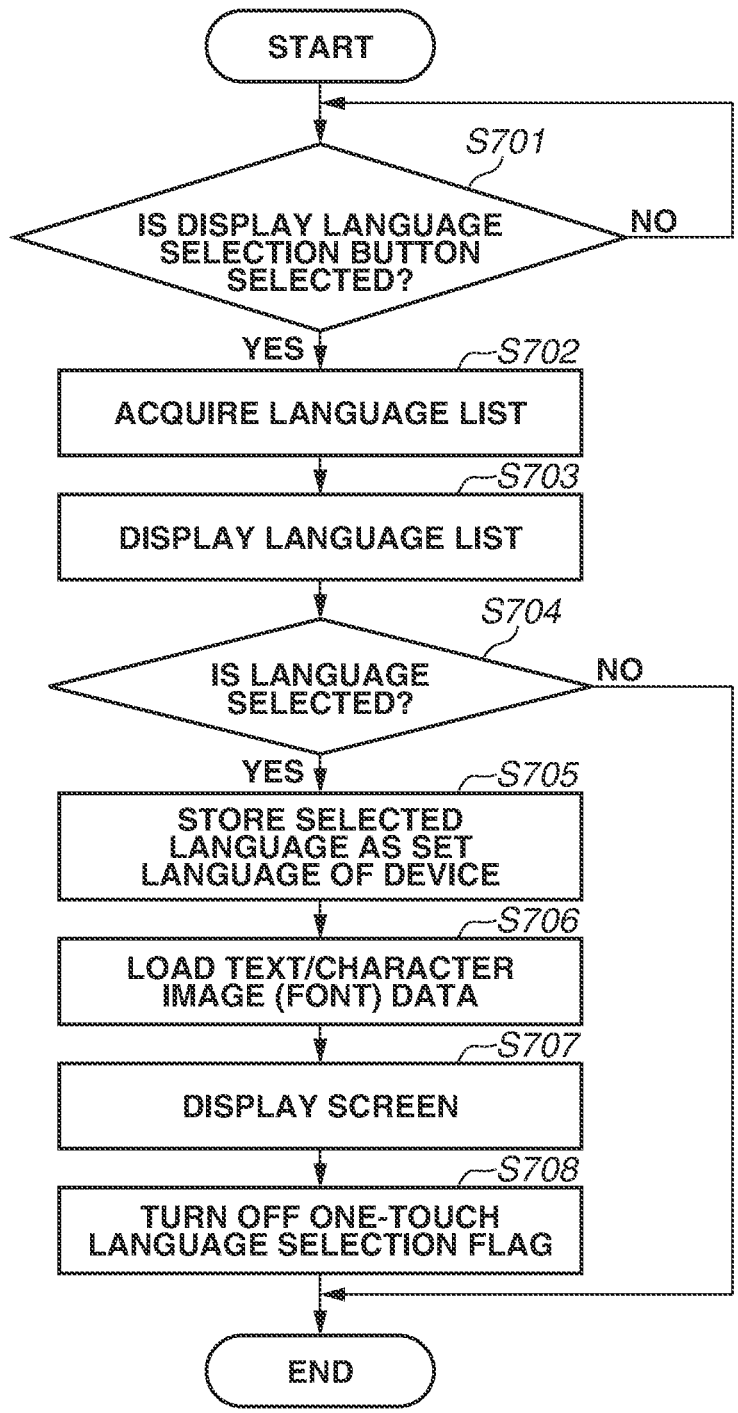
FIG. 7 is a flowchart illustrating an example of a process of setting the display language of the MFP on a display language selection screen.

FIG. 7 is a flowchart illustrating an example of a process of setting the display language of the MFP 10 on the display language selection screen 406. The CPU 101 reads a program stored in the ROM 102 onto the RAM 103 and executes the program to thereby realize the process illustrated in the flowchart in FIG. 7.

First, in step S701, the CPU 101 determines whether the display language selection button 405 is selected on the screen 404. If the CPU 101 determines that the display language selection button 405 is not selected (NO in step S701), the processing returns to step S701 and repeats step S701. On the other hand, if the CPU 101 determines that the display language selection button 405 is selected (YES in step S701), the processing proceeds to step S702.

In step S702, the CPU 101 acquires a selectable language list, and the processing proceeds to step S703. The language list can differ for each country the MFP 10 is intended to be used.

In step S703, the CPU 101 displays a display language selection screen as illustrated by the screen 406. Then, the processing proceeds to step S704.

In step S704, the CPU 101 determines whether a language is selected on the screen 406 by the user. If the CPU 101 determines that a language is selected (YES in step S704), the processing proceeds to step S705. On the other hand, if the CPU 101 determines that no language is selected (NO in step S704), the process is ended.

In step S705, the CPU 101 stores information indicating the selected language in the eMMC 109 as information indicating a set language of the device. Then, the processing proceeds to step S706. As used herein, the term "set language of the device" refers to the default language of the MFP 10.

In step S706, the CPU 101 loads text/character image (font) data for generating a screen to be displayed in the set language of the device that is selected in step S705. Text data and character image (font) data on all selectable languages can be loaded on the RAM 103, or alternatively, only the minimum required font data according to the set language of the device can be loaded on the RAM 103. Then, the processing proceeds to step S707.

In step S707, the CPU 101 displays a screen based on the data loaded on the RAM 103, and the processing proceeds to step S708. Further, in step S707, the CPU 101 stores, in the RAM 103, language information corresponding to the data loaded on the RAM 103. Specifically, in a case where English font data is loaded on the RAM 103, language information indicating English is stored in the RAM 103.

In step S708, the CPU 101 turns off a one-touch language selection flag, and the process is ended. As used herein, the term "one-touch language flag" refers to a flag that is used in a process illustrated in FIG. 11 described below, and the flag being on indicates that the display language is changed to a language different from the default language. On the other hand, the flag being off indicates that the display language is the same language as the default language. The MFP 10 according to the present exemplary embodiment determines whether to change the display language to the default language due to elapse of the auto clear time by checking the one-touch language flag.

Figure 8:
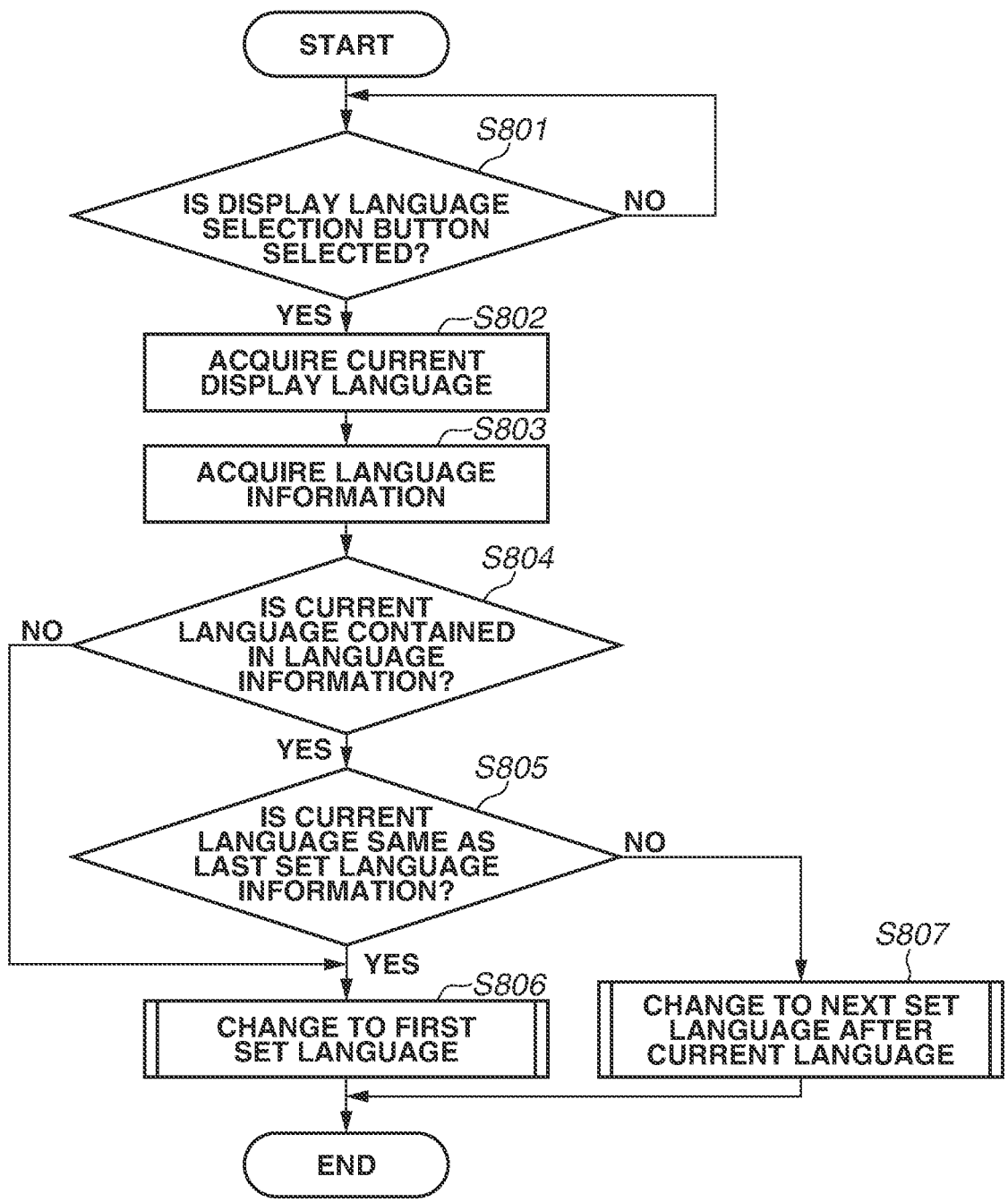
FIG. 8 is a flowchart illustrating an example of a process of changing the language when the language selection button is selected.

FIG. 8 is a flowchart illustrating an example of a process in which the language is changed using a toggle and displayed when the language selection button 307 is selected. The process illustrated in the flowchart is an example in which the display language is changed using the toggle when the language selection button 307 is selected by the user. The candidate display languages to be changed when the language selection button 307 is selected by the user can include not only the languages set on the screen 501 but also the default language. The CPU 101 reads a program stored in the ROM 102 onto the RAM 103 and executes the program to thereby realize the process illustrated in the flowchart in FIG. 8.

First, in step S801, the CPU 101 determines whether the language selection button 307 is selected. If the CPU 101 determines that the language selection button 307 is not selected (NO in step S801), the processing returns to step S801, and step S801 is repeated. On the other hand, if the CPU 101 determines that the language selection button 307 is selected (YES in step S801), the processing proceeds to step S802.

In step S802, the CPU 101 acquires, from the RAM 103, language information about the screen displayed on the display unit 105. The language information acquired herein is, for example, the language information stored in the RAM 103 in step S707. Then, the processing proceeds to step S803.

In step S803, the CPU 101 acquires the language information stored in the eMMC 109 when the OK button 502 is selected on the setting screen 501. Then, the processing proceeds to step S804.

In step S804, the CPU 101 determines whether the language of the screen that is currently displayed on the display unit 105 is contained in the language information acquired in step S803. If the CPU 101 determines that the displayed language is not contained in the language information acquired in step S803 (NO in step S804), the processing proceeds to step S806. On the other hand, if the CPU 101 determines that the displayed language is contained in the language information acquired in step S803 (YES in step S804), the processing proceeds to step S805.

In step S805, the CPU 101 determines whether the language displayed on the display unit 105 is the same as the last set language information among the language information set on the setting screen 501. As used herein, the term "last set language information" refers to language information that is set to the language given the largest number among languages 1 to 5 on the setting screen 501 to which language information is set. For example, in the case where Japanese, English, and French are set as languages 1, 2, and 3, respectively, as in the setting screen 501 in FIG. 5, the last set language information is the language information about French set as language 3 among the language information set on the setting screen 501. If the CPU 101 determines that the displayed language is not the same as the last set language information among the language information set on the setting screen 501 (NO in step S805), the processing proceeds to step S807. On the other hand, if the CPU 101 determines that the displayed language is the same as the last set language information among the language information set on the setting screen 501 (YES in step S805), the processing proceeds to step S806.

In step S806, the CPU 101 changes the display language to a language specified by the first set language information among the language information set on the setting screen 501. Then, the process is ended. As used herein, the term "first set language information" refers to language information that is set to the language given the smallest number among languages 1 to 5 on the setting screen 501 to which language information is set. For example, in the case where Japanese, English, and French are set as languages 1, 2, and 3, respectively, as in the setting screen 501 in FIG. 5, the first set language information is the language information about Japanese set as language 1 among the language information set on the setting screen 501.

In step S807, the CPU 101 changes the language of the screen displayed on the display unit 105 to the next set language after the current language displayed on the display unit 105 among the language information set on the setting screen 501. Then, the process is ended.

While description has been given of the example in which the languages set on the setting screen 501 are switched in the order the languages are set in response to the language selection button 307 being selected by the user in the present exemplary embodiment, the present exemplary embodiment is not limited to the example. Alternatively, for example, when the language selection button 307 is selected by the user, a list of languages set on the setting screen 501 can be displayed on the display unit 105, so that when the user selects one of the languages from the list, the display language is changed to the selected language.

Figure 10:
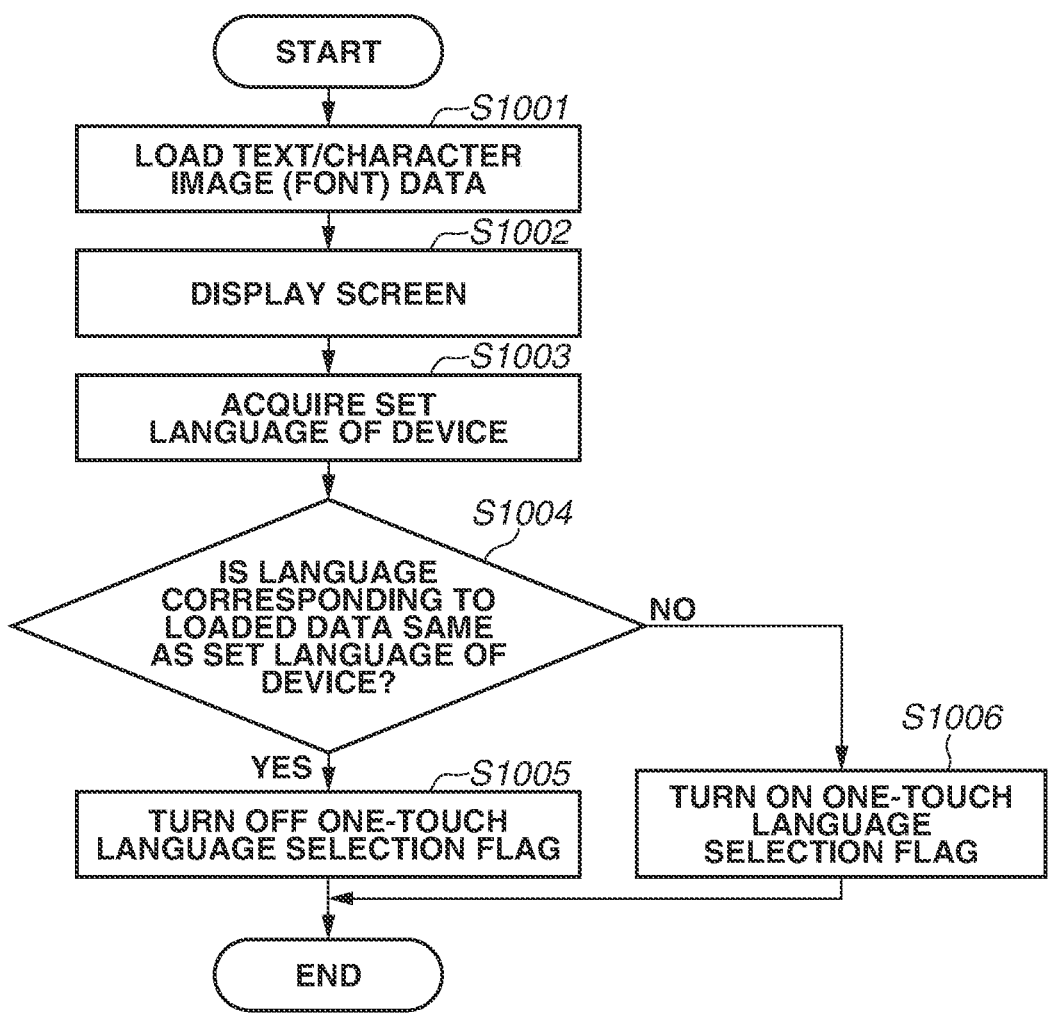
FIG. 10 is a flowchart illustrating an example of a process of changing the display language.

FIG. 10 is a flowchart illustrating an example of process of changing the display language. The CPU 101 reads a program stored in the ROM 102 onto the RAM 103 and executes the program to thereby realize the process illustrated in the flowchart in FIG. 10.

The flowchart illustrated in FIG. 10 specifies details of the process at the time of changing the display language in steps S806 and S807 in FIG. 8, and the process illustrated in the flowchart in FIG. 10 is started when step S806 or S807 is executed.

First, in step S1001, the CPU 101 loads text/character image (font) data on the RAM 103 based on the language information to be set in step S806 or S807. Then, the processing proceeds to step S1002.

In step S1002, the CPU 101 displays the screen based on the data loaded on the RAM 103, and the processing proceeds to step S1003.

In step S1003, the CPU 101 acquires the information indicating the set language of the device stored in the eMMC 109 in step S705, and the processing proceeds to step S1004.

In step S1004, the CPU 101 determines whether the language corresponding to the text/character image (font) data loaded in step S1001 is the same as the language corresponding to the information that is acquired in step S1003 and indicates the set language of the device. If the CPU 101 determines that the languages are the same (YES in step S1004), the processing proceeds to step S1005. On the other hand, if the CPU 101 determines that the languages are not the same (NO in step S1004), the processing proceeds to step S1006.

In step S1005, the CPU 101 turns off the one-touch language selection flag, and the process is ended.

In step S1006, the CPU 101 turns on the one-touch language selection flag, and the process is ended.

Figure 11:
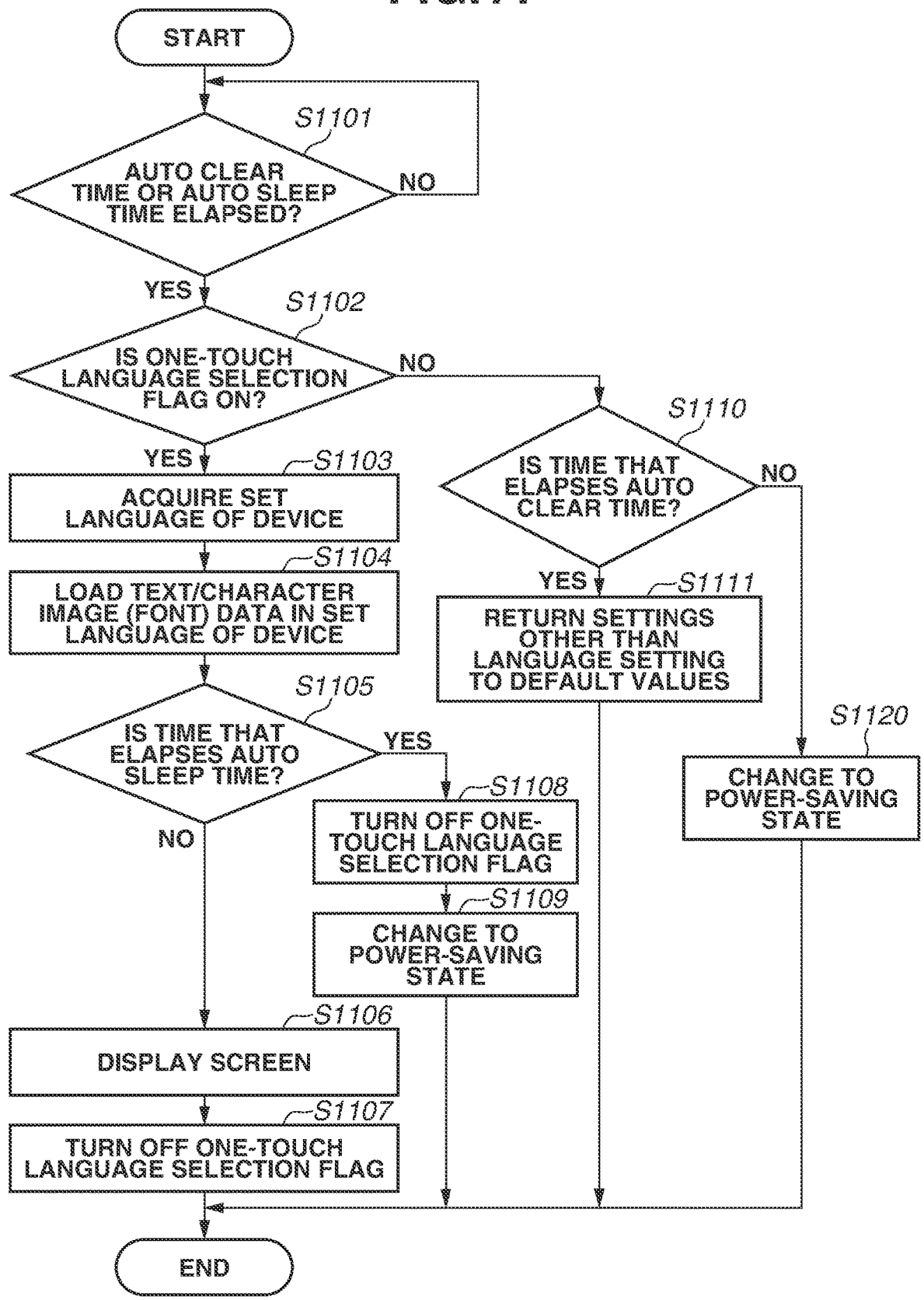
FIG. 11 is a flowchart illustrating an example of a process in a case of executing an auto clear function of the MFP and a process in a case of executing an auto sleep function of the MFP.

FIG. 11 is a flowchart illustrating an example of a process in a case of executing an auto clear function of the MFP 10 and a process in a case of executing an auto sleep function of the MFP 10. The CPU 101 reads a program stored in the ROM 102 onto the RAM 103 and executes the program to thereby realize the process illustrated in the flowchart in FIG. 11.

The term "auto clear" refers to a function for restoring the value of each setting other than the default language setting, such as the number of sheets or sheet size for each function such as a copy or fax function, to a default value, in a case where a user operation via the operation unit 107 is not received for a predetermined period of time. The predetermined period of time for executing the auto clear function can be a user-settable value or a value that is set at the time of shipment from the factory. The predetermined period of time for executing the auto clear function is referred to as "auto clear time", and the auto clear function is executed when the auto clear time elapses.

Further, the term "auto sleep" refers to a function in which the MFP 10 is automatically changed to a power-saving state in a case where a user operation via the operation unit 107 is not received for a predetermined period of time or a state without fax transmission/reception continues for a predetermined period of time. In a case where the user is logged in to the MFP 10 using the user authentication function 205, if the MFP 10 is changed to the power-saving state, the user is automatically logged out, and when the MFP 10 is restored from the power-saving state, a login screen is displayed on the display unit 105. The predetermined period of time for executing the auto sleep function can be a user-settable value or a value that is set at the time of shipment from the factory. The predetermined period of time for executing the auto sleep function is referred to as "auto sleep time", and the auto sleep function is executed when the auto sleep time elapses.

However, there is a problem as described below in the case of including the display language selection screen 406 for changing to the user-selected language and setting the language as the default language and the language selection button 307 for changing to one of the pre-registered languages.

For example, in a case where a language that is understandable by a majority of the users of the MFP 10 is set as the default language of the MFP 10 by the administrator user, a user who is unable to understand the language needs to change the language each time the user uses the MFP 10. In this case, the user who is unable to understand the default language is likely to use the language selection button 307 to change the language.

Consequently, after the user who is unable to understand the default language changes the language without changing the default language, when a user among the majority of users of the default language of the MFP 10 is to use the MFP 10, the user needs to change the language, which is an inconvenient operation. Further, even in the case where the default language is also settable by a user who is not the administrator user, a plurality of user operations is required to set the default language, i.e., the set language of the device, whereas use of the language selection button 307 enables setting by a single operation. Thus, the language selection button 307 is considered to be used to temporarily change the display language, so that it is demanded to return the display language which had been changed by selecting the language selection button 307 to the default language with ease.

In response to the above-described problem, a system whereby a user who wishes to use an information processing apparatus in a default language can use the information processing apparatus in the default language without changing the language to the default language in a case where the language is changed without changing the default language is provided by executing a process described below.

First, in step S1101, the CPU 101 determines whether the auto clear time or the auto sleep time has elapsed. If the CPU 101 determines that the auto clear time or the auto sleep time has elapsed (YES in step S1101), the processing proceeds to step S1102. Otherwise (NO in step S1101), the processing returns to step S1101. While the two functions, the auto clear function and the auto sleep function, are included in the present exemplary embodiment, the functions to be included are not limited to those described above. For example, in a case where only one of the two functions is included, the function can be executed when the time of a timer of the function is up. Further, in a case where a plurality of functions is included, when a timeout of one of the plurality of functions occurs, the function can be executed.

In step S1102, the CPU 101 determines whether the one-touch language selection flag is on. If the CPU 101 determines that the one-touch language selection flag is on (YES in step S1102), the processing proceeds to step S1103. On the other hand, if the CPU 101 determines that the one-touch language selection flag is off (NO in step S1102), the processing proceeds to step S1110.

In step S1103, the CPU 101 acquires, from the ROM 102, the font data about the language corresponding to the information indicating the set language of the device stored in the eMMC 109, and the processing proceeds to step S1104.

In step S1104, the CPU 101 loads the text/character image (font) data corresponding to the set language of the device on the RAM 103. Then, the processing proceeds to step S1105.

In step S1105, whether the time that elapsed in step S1101 is the auto sleep time. If the time that elapsed in step S1101 is the auto sleep time (YES in step S1105), the processing proceeds to step S1108. Otherwise (NO in step S1105), the processing proceeds to step S1106.

In step S1106, the CPU 101 displays a screen based on the data loaded on the RAM 103. The screen displayed in step S1106 is a home screen as illustrated by the screen 301 in the case a timeout of the auto clear time occurs in step S1105. Further, since the auto clear function is executed, the value of each setting other than the language setting, such as the number of sheets or sheet size for each function such as the copy or fax function, is restored to the default value. Then, the processing proceeds to step S1107.

In step S1107, the CPU 101 turns off the one-touch language selection flag, and the process is ended.

In step S1108, the CPU 101 turns off the one-touch language selection flag, and the process is ended.

In step S1109, the CPU 101 executes the auto sleep function, changes the MFP 10 to the power-saving state, and displays nothing on the display unit 105. Further, if the MFP 10 is restored from the power-saving state by a user operation, a screen is displayed on the display unit 105 using the font data corresponding to the set language of the device loaded on the RAM 103 in step S1104.

The case in which the CPU 101 determines that the one-touch language flag is not on in step S1102 will be described below. In step S1110, the CPU 101 determines whether the time that elapsed in step S1101 is the auto clear time. If the time that elapsed in step S1101 is the auto clear time (YES in step S1110), the processing proceeds to step S1111. Otherwise (NO in step S1110), the processing proceeds to step S1120.

In step S1111, the CPU 101 returns the value of each setting other than the language setting, such as the number of sheets or sheet size for each function such as the copy or fax function, to the default value, and the process is ended.

In step S1120, the CPU 101 changes the MFP 10 to the power-saving state, and the process is ended.

While description has been given of the example in which the MFP 10 according to the present exemplary embodiment switches the languages set on the setting screen 501 using the toggle in the order the languages are set when the language selection button 307 is selected by the user, the present exemplary embodiment is not limited to the example. Alternatively, for example, when the language selection button 307 is selected by the user, a list of languages set on the setting screen 501 can be displayed on the display unit 105, so that when the user selects one of the languages from the list, the display language is changed to the selected language.

Figure 12:
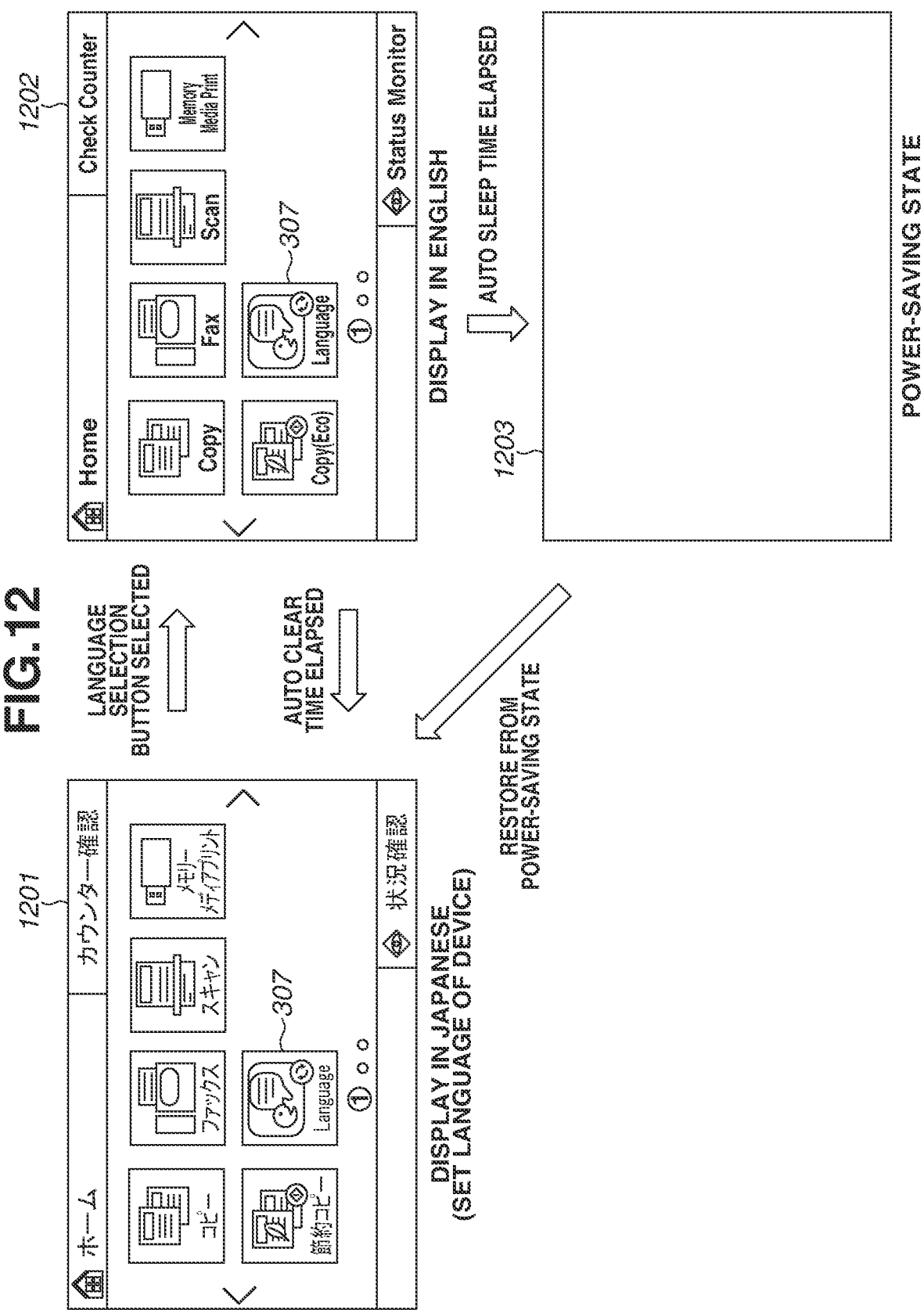
FIG. 12 is a diagram illustrating an example of a sequence of changing the language again by the auto clear function or the auto sleep function after the language is changed as a result that the language selection button is selected.

FIG. 12 illustrates an example of a sequence of changing the language of the screen in a case where the auto clear function or the auto sleep function is executed after the language is changed by selecting the language selection button 307.

First, a screen 1201 is displayed in Japanese which is the set language of the device. In this state, when the language selection button 307 is selected, the screen 1201 is displayed in English as illustrated by a screen 1202.

Thereafter, if a key operation by the user is not received for a predetermined period of time, the auto clear time elapses, and the screen displayed on the display unit 105 is displayed in Japanese which is the set language of the device as illustrated by the screen 1201.

Further, if a key operation by the user is not received for the predetermined period of time and the auto sleep time elapses, the supply of power to the display unit 105 is stopped, and nothing is displayed on the display unit 105 as illustrated by a screen 1203. Thereafter, if the MFP 10 is restored from the power-saving state, the screen on the display unit 105 is displayed in Japanese which is the set language of the device as illustrated by the screen 1201.

The above-described process is executed to provide a system whereby a user who wishes to use an information processing apparatus in a default language can use the information processing apparatus in the default language without changing the language to the default language in a case where the language is changed without changing the default language. There may be a case in which, for example, the language selection button 307 is selected by a non-administrator user and the display language is set to English while the default language of the MFP 10 is set to Japanese by a user having logged in using the administrator user ID and the administrator password. In this case, the user having selected the language selection button 307 ends the operation of the MFP 10 according to the present exemplary embodiment and the auto clear function is executed so that the display language is automatically restored to the default language.

In the first exemplary embodiment, the example in which the auto clear function or the auto sleep function of the MFP 10 is executed so that the language of the screen displayed on the display unit 105 is restored to the set language of the device has been described. In a second exemplary embodiment, an example will be described in which after a job of a function of the MFP 10 is executed, whether the user wishes to continue the use of the device is checked, and if the user does not wish to continue the use of the device, the language of the screen displayed on the display unit 105 is restored to the set language of the device. Mainly a difference of the present exemplary embodiment from the first exemplary embodiment will be described below.

Figure 13:
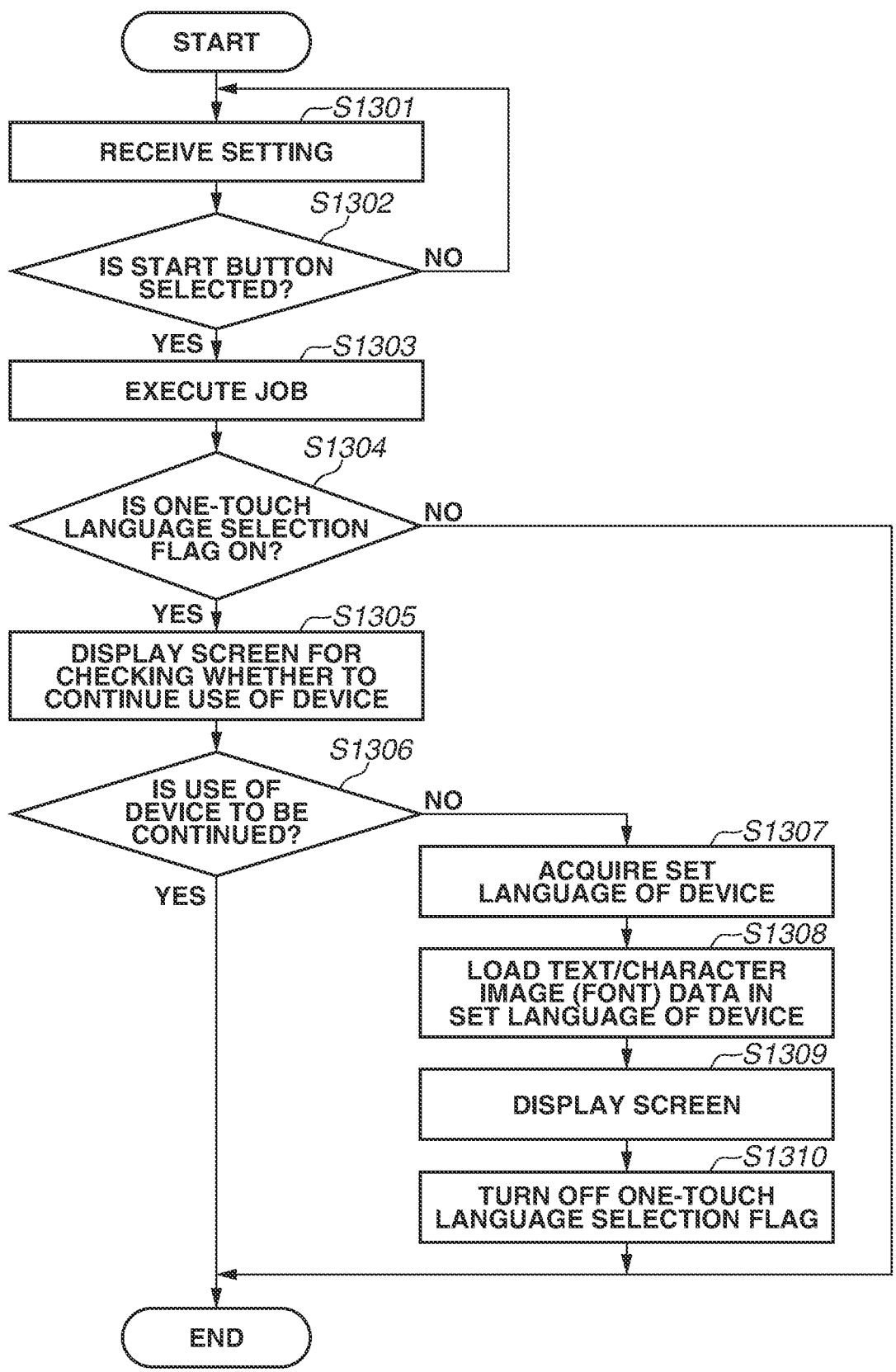
FIG. 13 is a flowchart illustrating an example of a process of executing a job of a function of the MFP.

FIG. 13 is a flowchart illustrating an example of a process of executing a job of a function of the MFP 10. The CPU 101 reads a program stored in the ROM 102 onto the RAM 103 and executes the program to thereby realize the process illustrated in the flowchart in FIG. 13.

The process illustrated in FIG. 13 is started when, for example, a button for executing a function of the MFP 10, such as the copy button 302 or the fax button 303 on the screen 301, is selected.

With the method described in the first exemplary embodiment in which the auto clear function or the auto sleep function of the MFP 10 is executed to thereby return the display language to the set language of the device, the display language of the display unit 105 can be automatically returned to the set language of the device. However, in a case where the next user wishes to use the MFP 10, the user needs to either wait until the auto clear time or the auto sleep time elapses or manually change the MFP 10 to the power-saving state, which is inconvenient. In order to solve this inconvenience, the process described below is executed.

Figure 14:
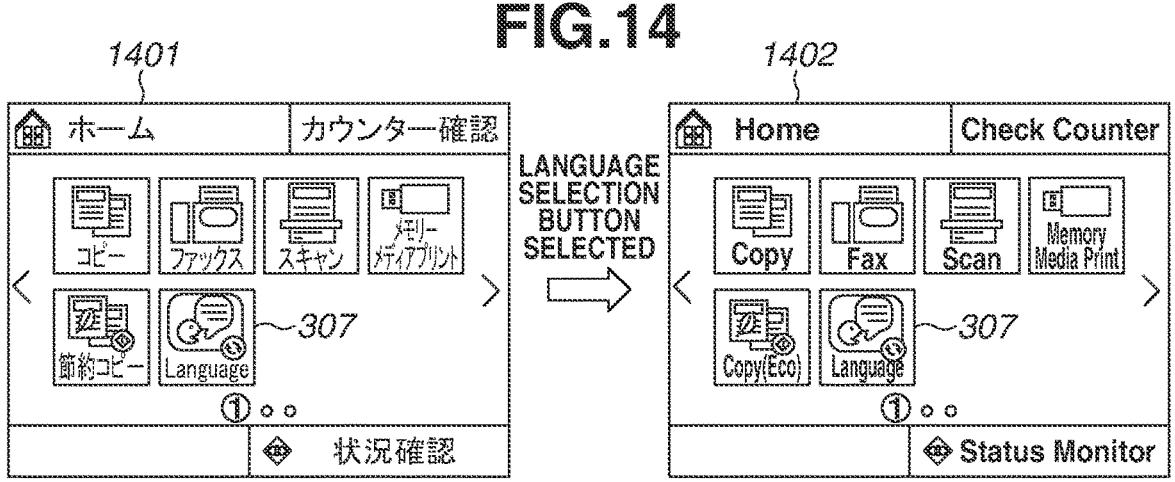
FIG. 14 is a diagram illustrating an example of a sequence of changing a screen in the case of displaying a screen for checking whether the user wishes to continue to use the MFP after the language selection button is selected so that the display language is changed.

First, in step S1301, the CPU 101 receives a setting such as the number of sheets or sheet size corresponding to the function. Then, the processing proceeds to step S1302. The setting such as the number of sheets or sheet size corresponding to the function is received via a copy setting screen such as a screen 1403 in FIG. 14. FIG. 14 illustrates an example of a sequence of changing a screen in the case of displaying a screen for checking whether the user wishes to continue to use the MFP 10 after the language selection button 307 is selected to change the display language. As an example other than the copy function, in a case of a setting of a transmission function, in which image data generated by a scan is transmitted via email, the CPU 101 receives the setting such as a transmission destination address and reading resolution on a setting screen (not illustrated).

In step S1302, the CPU 101 determines whether a start button for issuing an instruction to start execution of a function is selected by the user. If the start button is selected (YES in step S1302), the processing proceeds to step S1302. On the other hand, if the start button is not selected (NO in step S1302), the processing returns to step S1301, and step S1301 is repeated. In step S1302, for example, it is determined whether a "B&W Start" button 1410 or a "Color Start" button 1411 on the screen 1403 in FIG. 14 is selected.

In step S1303, the CPU 101 executes a job corresponding to the function based on the setting received in step S1301. For example, in a case of a copy job, the reading unit 111 reads a document image and generates image data and the recording unit 113 prints an image on a sheet based on the generated image data based on the setting such as the number of sheets and size set in step S1301. Further, for example, in the case of the transmission function, the reading unit 111 reads a document image based on the reading resolution set in step S1301, generates image data, and transmits an email with the image data attached based on the transmission destination address set in step S1301. If the execution of the job is ended, the processing proceeds to step S1304. During the execution of the job, a screen such as a screen 1404 illustrated in FIG. 14 is displayed on the display unit 105.

In step S1304, the CPU 101 determines whether the one-touch language selection flag is on. In the case where the language is changed before the job is executed in step S1303 as a result of the language selection button 307 being selected as in FIGS. 8 and 10, the one-touch language selection flag is on (YES in step S1304), and the processing proceeds to step S1305. If the CPU 101 determines that the one-touch language selection flag is off (NO in step S1304), the process is ended. The screen that is displayed when the language is changed before the job is executed in step S1303 as a result of the language selection button 307 being selected is, for example, a screen displayed in English as in a screen 1402.

In step S1305, the CPU 101 displays, on the display unit 105, a screen for checking whether the user wishes to continue the use of the device. The screen for checking whether the user wishes to continue the use of the device is, for example, a screen 1405 illustrated in FIG. 14. A user instruction as to whether the user wishes to continue the use of the device is received on the screen 1405. Then, the processing proceeds to step S1306. The screen for checking whether the user wishes to continue the use of the device is, for example, the screen 1405 illustrated in FIG. 14. The CPU 101 determines whether the user wishes to continue the use of the device based on whether which one of a "Yes" button 1412 and a "No" button 1413 is selected on the screen 1404.

In step S1306, the CPU 101 determines whether the user wishes to continue the use of the device. Specifically, if the "No" button 1413 is selected on the screen 1405 for checking whether the user wishes to continue the use of the device, the CPU 101 determines that the user does not wish to continue the use of the device (NO in step S1306), and the processing proceeds to step S1307. On the other hand, if the "Yes" button 1412 is selected, the CPU 101 determines that the user wishes to continue the use of the device (YES in step S1306), and the process is ended. Further, in the case where the "Yes" button 1412 is selected, the screen for receiving the setting such as the number of sheets or sheet size corresponding to the function is displayed again without changing the language.

In step S1307, the CPU 101 acquires, from the ROM 102, the font data about the language corresponding to the information indicating the set language of the device stored in the eMMC 109, and the processing proceeds to step S1308.

In step S1308, the CPU 101 loads the text/character image (font) data corresponding to the set language of the device on the RAM 103. Then, the processing proceeds to step S1309.

In step S1309, the CPU 101 displays a screen based on the data loaded on the RAM 103. Then, the processing proceeds to step S1310. The screen displayed in step S1309 is a home screen as illustrated by a screen 1401 in FIG. 14 in which the language is set to Japanese set as the set language of the device.

In step S1310, the CPU 101 turns off the one-touch language selection flag, and the process is ended.

By executing the above-described process, the MFP 10 according to the present exemplary embodiment can return the setting to the set language of the device without requiring the user to wait until the auto clear function or the auto sleep function is executed as a result of lapse of the auto clear timer or the auto sleep timer or requiring the user to manually change the MFP 10 to the power-saving state.

In the first exemplary embodiment, description has been given of the example in which the display language is restored to the set language of the device as a result of lapse of the auto clear time or the auto sleep time of the MFP 10 in the case where the language selection button 307 is selected to change the language. In a third exemplary embodiment, an example will be described in which, when a user logs in to the MFP 10 using the user authentication function 205, the screen is displayed in the language stored in association with the user as the display language. Further, mainly a difference of the present exemplary embodiment from the first exemplary embodiment will be described below.

Figure 9:
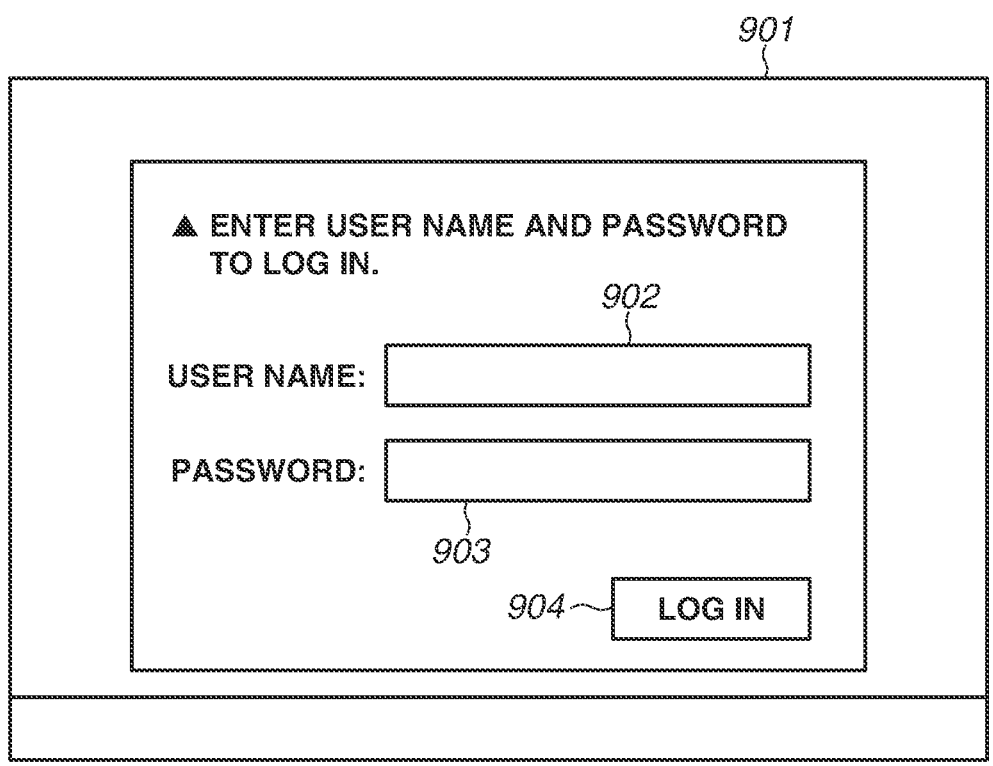
FIG. 9 is a diagram illustrating an example of a login screen of the MFP that is displayed on the display unit.

FIG. 9 illustrates an example of a login screen of the MFP 10 that is displayed on the display unit 105.

Figure 15:
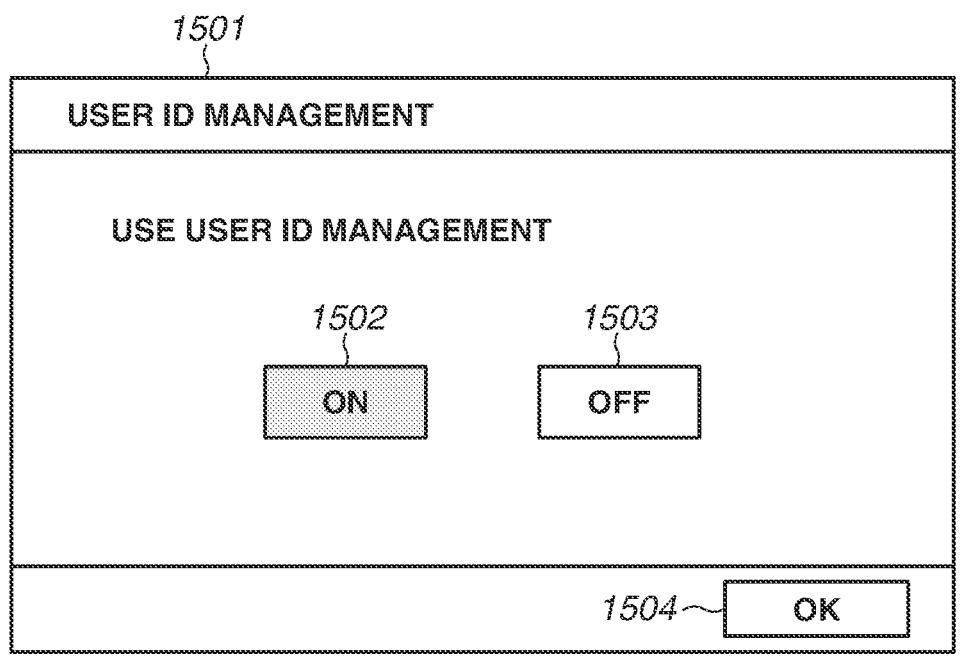
FIG. 15 is a diagram illustrating an example of a setting screen for turning on/off the user authentication function of the MFP.

A screen 901 is a login screen of the MFP 10 that is displayed on the display unit 105 and via which input of a user ID and password as authentication information is received from the user. The authentication information can be received by manual user input via the operation unit 107 or a touch of an IC card on an IC card reader. The screen 901 is a screen that is displayed when the MFP 10 is activated or restored from the power-saving state or when the user logs out in a case where the user authentication function 205 of the MFP 10 is on. As used herein, the phrase "case in which the user authentication function 205 is on" refers to a case where a button 1502 for turning on the user authentication function 205 is selected by the user on a setting screen 1501 in FIG. 15 and this setting is stored in the eMMC 109. FIG. 15 illustrates an example of a setting screen for turning on/off the user authentication function 205 of the MFP 10. The screen 1501 is a setting screen for turning on/off the user authentication function 205 of the MFP 10. The button 1502 is a button for turning on the user authentication function 205 when the button 1502 is selected by the user. A button 1503 is a button for turning off the user authentication function 205 in the case where the button 1503 is selected by the user. A button 1504 is a button for storing, in the eMMC 109, information indicating the setting (on/off) corresponding to the button selected at that time point in the case where the button 1504 is selected by the user.

Figure 16:
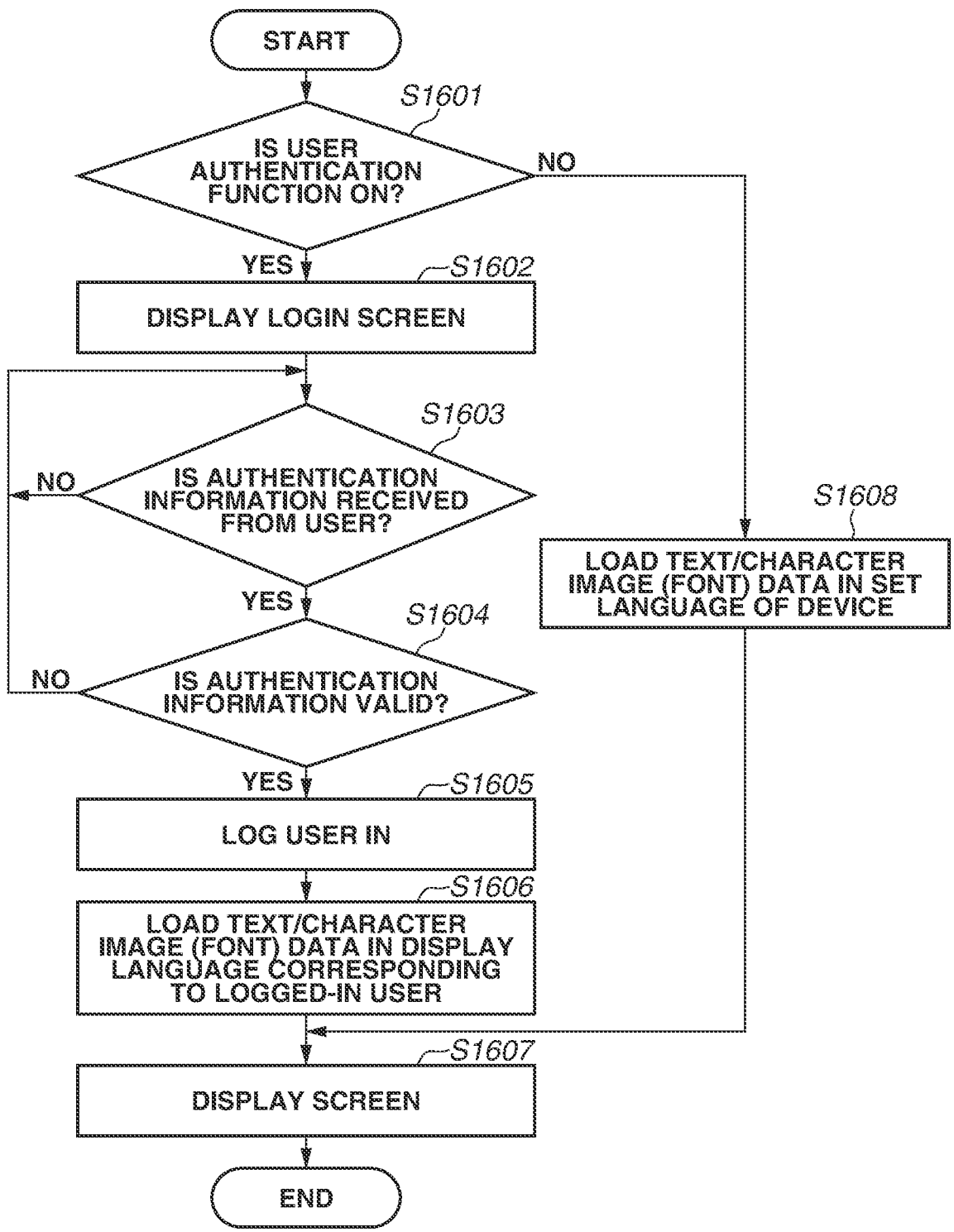
FIG. 16 is a flowchart illustrating an example of a process at the time a user logs in to the MFP.

FIG. 16 is a flowchart illustrating an example of a process at the time the user logs in to the MFP 10. The CPU 101 reads a program stored in the ROM 102 onto the RAM 103 and executes the program to thereby realize the process illustrated in the flowchart in FIG. 16.

The flowchart illustrated in FIG. 16 is started when the MFP is activated or restored from the power-saving state or when the user logs out of the MFP 10.

In step S1601, the CPU 101 determines whether the user authentication function 205 is on. If the CPU 101 determines that the user authentication function 205 is on (YES in step S1601), the processing proceeds to step S1602. Otherwise (NO in step S1601), the processing proceeds to step S1608. The setting of the user authentication function 205 is turned on/off by a user operation received on the screen 1501. Further, the setting of the user authentication function 205 can be made settable only by a user having logged in to the MFP 10 using the administrator user ID and the administrator password or can be made settable by any user.

In step S1602, the CPU 101 displays, on the display unit 105, the login screen 901 as illustrated in FIG. 9.

In step S1603, the CPU 101 determines whether the authentication information is received from the user while the login screen 901 is displayed on the display unit 105. If the CPU 101 determines that the authentication information is received (YES in step S1603), the processing proceeds to step S1604. Otherwise (NO in step S1603), the processing returns to step S1603.

In step S1604, the CPU 101 determines whether the authentication information received in step S1603 matches the authentication information stored in the user DB 210. If the CPU 101 determines that the received authentication information matches the stored authentication information (YES in step S1604), the processing proceeds to step S1605. Otherwise (NO in step S1604), the processing returns to step S1603.

In step S1605, the CPU 101 lets the user log in and stores the received authentication information in the RAM 103.

In step S1606, the CPU 101 extracts the user ID of the logged-in user in step S1605 from the RAM 103 and loads the text/character image (font) data corresponding to the display language corresponding to the extracted user ID on the RAM 103. The font data about the display language corresponding to the user ID is loaded on the RAM 103 using, for example, a method as described below. As in a list 1701 in FIG. 17, each user ID is stored in association with the language set using the language selection button 307 or the display language selection screen 406 by the user of the user ID, and the screen is displayed in the language corresponding to the logged-in user by referring to the list 1701. The list 1701 is stored in the eMMC 109 of the MFP 10. FIG. 17 illustrates an example of a list in which each user ID is stored in association with a display language set by the user of the user ID.

In step S1607, the CPU 101 displays a screen based on the data loaded on the RAM 103, and the process is ended.

Back to the description of step S1601, in step S1601, if the CPU 101 determines that the authentication function is not on (NO in step S1601), the processing proceeds to step S1608. In step S1608, the CPU 101 acquires, from the ROM 102, the text/character image (font) data about the language corresponding to the information indicating the set language of the device stored in the eMMC 109, and loads the acquired data on the RAM 103. Then, the processing proceeds to step S1607.

There arises an issue as described below if the display language is restored to the set language of the device as a result of the auto clear function being executed after the display language is changed using the language selection button 307 or the display language selection screen 406 in the case where each user logs in to the MFP 10 to use the MFP 10. For example, after a user who wishes to use the MFP 10 in a language different from the set language of the device logs in to the MFP 10 and changes the display language to a different language, if the auto clear function is executed, the display language is changed to the set language of the device. Thus, when the same user logs in to the MFP 10 next time, the user needs to change the display language again to the language the user used, which is inconvenient. In order to solve this issue, a process described below is executed.

FIG. 18 is a flowchart illustrating a process at the time of receiving an instruction to change the display language. The CPU 101 reads a program stored in the ROM 102 onto the RAM 103 and executes the program to thereby realize the process illustrated in the flowchart in FIG. 18.

In step S1801, the CPU 101 determines whether an instruction to change the display language is received via the language selection button 307 or the display language selection screen 406. If the CPU 101 determines that an instruction to change the display language is received (YES in step S1801), the processing proceeds to step S1802. Otherwise (NO in step S1801), the processing returns to step S1801.

In step S1802, the CPU 101 loads, on the RAM 103, the text/character image (font) data corresponding to the display language specified by the instruction. Further, the CPU 101 stores, in the RAM 103, information indicating the display language specified by the instruction.

In step S1803, the CPU 101 displays a screen based on the data loaded on the RAM 103 in step S1802.

In step S1804, the CPU 101 determines whether the user authentication function 205 of the MFP 10 is on. If the user authentication function 205 is on (YES in step S1804), the processing proceeds to step S1805. Otherwise (NO in step S1804), the processing proceeds to step S1806.

In step S1805, the CPU 101 extracts the information indicating the display language stored in the RAM 103 in step S1802 and stores the user ID of the logged-in user in association with the display language in the eMMC 109 as in the list 1701 in FIG. 17, and the process is ended.

In step S1806, the processing proceeds to step S1101 of the flowchart in FIG. 11, and after the process of the flowchart in FIG. 11 is executed, the process is ended.

The above-described process is executed so that in the case where the user having logged in to the MFP 10 changes the display language, when the user logs out of the MFP 10 and then logs in to the MFP 10 again, the screen is displayed in the changed display language.

While the example in which the CPU 101 displays the screens on the display unit 105 is described in the present exemplary embodiment, the display is not limited to the example, and the screens can be displayed on, for example, the web browser of the client PC which is LAN-connected to the MFP 10.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:
1. An image forming apparatus comprising:
a user interface that receives a user instruction for changing a display language; and
a controller that changes, based on the received user instruction, the display language,
wherein the controller executes a copy function in a state that the display language has been changed from a first language to a second language based on the received user instruction, and then
the controller causes, after completion of the execution of the copy function, the user interface to display a confirmation screen for confirming whether to continue use of the copy function to a user, and then
the controller changes, based on a user instruction for not continuing the use of the copy function, the display language from the second language back to the first language.
2. The image forming apparatus according to claim 1, wherein the controller continues, based on a user instruction for continuing the use of the copy function, use of the second language as the display language.

3. The image forming apparatus according to claim 2,
wherein a first object and a second object are included in the confirmation screen,
wherein the user instruction for not continuing the use of the copy function is selection of the second object by the user, and
wherein the user instruction for continuing the use of the copy function is selection of the first object by the user.

4. The image forming apparatus according to claim 2,
wherein the controller causes, based on the user instruction for continuing the use of the copy function, the user interface to display a copy setting screen without changing the display language from the second language.

5. The image forming apparatus according to claim 1,
wherein the user interface receives the user instruction for changing the display language that is commonly used for displaying a plurality of screens from the first language to the second language.

6. The image forming apparatus according to claim 1,
wherein the changed display language is not a language that corresponds to a user.

7. The image forming apparatus according to claim 1,
wherein the controller changes the display language without execution of a login process for logging in to the image forming apparatus.

8. The image forming apparatus according to claim 1,
wherein the controller executes a FAX function in a state that the display language has been changed from the first language to the second language based on the received user instruction, and then
the controller causes, after completion of the execution of the FAX function, the user interface to display a confirmation screen for confirming whether to continue use of the FAX function to a user, and then
the controller changes, based on a user instruction for not continuing the use of the FAX function, the display language from the second language back to the first language.

9. The image forming apparatus according to claim 1,
wherein the user interface receives the user instruction for changing the display language in a state that the user interface displays a screen for selecting from a plurality of functions including the copy function, a scan function and a FAX function of the image forming apparatus.

10. The image forming apparatus according to claim 9,
wherein the screen for selecting the plurality of functions of image forming apparatus is a home screen.

11. The image forming apparatus according to claim 1,
wherein the first language is a default display language of the image forming apparatus.

12. The image forming apparatus according to claim 1,
wherein the controller uses the changed display language to display a screen even if a screen displayed is switched.

13. The image forming apparatus according to claim 1,
further comprising
a printer; and
a scanner,
wherein, by the execution of the copy function by the controller, the scanner scans a document to generated image data, and then the printer prints an image based on the generated image data on a sheet.

14. An image forming method comprising:
receiving a user instruction for changing a display language;
changing, based on the received user instruction, the display language;
executing a copy function in a state that the display language has been changed from a first language to a second language;
causing, after completion of the execution of the copy function, a display to display a confirmation screen for confirming whether to continue use of the copy function to a user; and
changing, based on a user instruction for not continuing the use of the copy function, the display language from the second language back to the first language.

15. The image forming method according to claim 14, further comprising:
continuing, based on a user instruction for continuing the use of the copy function, use of the second language as the display language.

16. The image forming method according to claim 15,
wherein a first object and a second object are included in the confirmation screen,
wherein the user instruction for not continuing the use of the copy function is selection of the second object by the user, and
wherein the user instruction for continuing the use of the copy function is selection of the first object by the user.

17. The image forming apparatus according to claim 15,
wherein the controller causes, based on the user instruction for continuing the use of the copy function, the display to display a copy setting screen without changing the display language from the second language.

18. The image forming method according to claim 14,
wherein the user instruction for changing the display language that is commonly used for displaying a plurality of screens from the first language to the second language is received.

19. The image forming method according to claim 14,
wherein the changed display language is not a language that corresponds to a user.

20. The image forming method according to claim 14,
wherein the display language is changed without execution of a login process for logging in to an image forming apparatus.

21. The image forming method according to claim 14, further comprising:
executing a FAX function in a state that the display language has been changed from the first language to the second language based on the received user instruction;
causing, after completion of the execution of the FAX function, the display to display a confirmation screen for confirming whether to continue use of the FAX function to a user, and
changing, based on a user instruction for not continuing the use of the FAX function, the display language from the second language to the first language.

22. The image forming method according to claim 14,
wherein the user instruction for changing the display language is received in a state that the display displays a screen for selecting from a plurality of functions including the copy function, a scan function and a FAX function.

23. The image forming method according to claim 22,
wherein the screen for selecting the plurality of functions is a home screen.

24. The image forming method according to claim 14, wherein the first language is a default display language.

25. The image forming method according to claim 14, wherein the changed display language is used to display a screen even if a displayed screen is switched.

26. The image forming method according to claim 14, wherein, by the execution of the copy function, a document is scanned to generated image data, and then an image based on the generated image data is printed on a sheet.

* * * * *